(12) United States Patent  
Mashino et al.

(10) Patent No.: US 8,516,328 B2
(45) Date of Patent: Aug. 20, 2013

(54) RECEPTION METHOD AND RECEPTION DEVICE

(75) Inventors: Jun Mashino, Yokosuka (JP); Takatoshi Sugiyama, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 217 days.

(21) Appl. No.: 13/002,416

(22) PCT Filed: Jul. 21, 2009

(86) PCT No.: PCT/JP2009/063046
§ 371 (c)(1),
(2), (4) Date: Jan. 3, 2011

(87) PCT Pub. No.: WO2010/010867
PCT Pub. Date: Jan. 28, 2010

(65) Prior Publication Data
US 2011/0107171 A1    May 5, 2011

(30) Foreign Application Priority Data

Jul. 22, 2008  (JP) ................. 2008-188809
Nov. 11, 2008  (JP) ................. 2008-288965

(51) Int. Cl.
*H04L 1/18* (2006.01)
(52) U.S. Cl.
USPC ............ 714/751; 714/794; 714/795; 375/341
(58) Field of Classification Search
None
See application file for complete search history.

(56) References Cited

U.S. PATENT DOCUMENTS

| | | | |
|---|---|---|---|
| 2005/0025262 A1 | 2/2005 | Tanabe et al. | |
| 2008/0045238 A1 | 2/2008 | Zhou et al. | |
| 2009/0125793 A1* | 5/2009 | Kishigami et al. | 714/794 |

FOREIGN PATENT DOCUMENTS

| | | |
|---|---|---|
| JP | 4-284031 | 10/1992 |
| JP | 4284031 | * 10/1992 |
| JP | 2005-27179 | 1/2005 |
| JP | 2005-318052 | 11/2005 |
| JP | 2005318052 | * 11/2005 |
| JP | 2007-282024 | 10/2007 |
| JP | 2008-17144 | 1/2008 |
| JP | 2008017144 | * 1/2008 |

(Continued)

OTHER PUBLICATIONS

Zhou, Liang, et al., "Improved Performance for Hybrid STBC and Spatial Multiplexing OFDM Systems with Linear Receivers," The 18th Annual IEEE International Symposium on Personal, Indoor and Mobile Radio Communications, Sep. 1, 2007, pp. 1-5.

(Continued)

*Primary Examiner* — John Trimmings
(74) *Attorney, Agent, or Firm* — Harness, Dickey & Pierce, P.L.C.

(57) ABSTRACT

In a multicarrier wireless communication system adopting forward error correction codes, a reception method adapted to a receiver 1 receiving wireless signals is constituted of an interference band detection process for selecting a sub-carrier having low reliability among a plurality of sub-carriers of desired waves as a specific sub-carrier, a weight coefficient generation process for generating weight coefficients for reducing reliability in sub-carriers with respect to the selected specific sub-carrier, a demodulation process for demodulating received wireless signals of sub-carriers, a weighted calculation process for performing weighted calculation applying weight coefficients to demodulated values of sub-carriers of wireless signals, and a decoding process for performing a decoding process for error correction on values calculated of sub-carriers.

24 Claims, 19 Drawing Sheets

(56) References Cited

FOREIGN PATENT DOCUMENTS

| JP | 2008-48424 | 2/2008 |
|---|---|---|
| WO | 2004/082182 A1 | 9/2004 |
| WO | 2007/135964 | 11/2007 |

OTHER PUBLICATIONS

Doufexi, Angela, et al., "An Investigation of the Impact of Bluetooth Interference on the Performance of 802.11g Wireless Local Area Networks," Proceedings of the 57th IEEE Semiannual Vehicular Technology Conference, Jeju, Korea, Apr. 22-25, 2003, pp. 680-684.

Jun Mashino, Mamoru Akimoto, Masashi Nakatugawa, "A Study on subcarrier overlapping for OFDMA wireless system", General Meeting Proceedings Collection, the Institute of Electronics, Information and Communication Engineers, B-5-130, Mar. 2008.

Mamoru Sawahashi, Kenichi Kiguchi et al, "Pilot Symbol-Assisted Coherent Multistage Interference Canceller with Recursive Channel Estimation for DS-CDMA Mobile Radio", Research Report of Institute of Electronic and Information Engineers, Information Theory IT, the Institute of Electronics, Information and Communication Engineers, Mar. 1996, vol. 95, No. 591, pp. 101-106.

Yusuke Asai, Takatoshi Sugiyama et al, "Hierarchical Interface Canceller Using Error Detection and Selection for SDM-COFDM", Research Report of the Institute of Electronics, Information and Communication Engineers, Antenna and Transmission, the Institute of Electronics, Information and Communication Engineers, Mar. 2003, vol. 102, No. 671, pp. 111-116.

Decision of Rejection, Japanese Patent Application No. 2010-521700, Jan. 29, 2013.

* cited by examiner

RECEPTION METHOD AND RECEPTION DEVICE

CROSS-REFERENCE TO RELATED APPLICATIONS

This application is a 371 U.S. National Stage of International Application No. PCT/JP2009/063046, filed Jul. 21, 2009. This application claims priority to Japanese Patent Applications JP 2008-188809, filed Jul. 22, 2008, and JP 2008-288965, filed Nov. 11, 2008. The disclosures of the above applications are entirely incorporated by reference herein.

TECHNICAL FIELD

The present invention relates to reception devices and reception methods adopting forward error correction codes in multicarrier communication systems.

The present invention claims priority on Japanese Patent Application No. 2008-188809 filed on Jul. 22, 2008 and Japanese Patent Application No. 2008-288965 filed on Nov. 11, 2008, the contents of which are incorporated herein by reference.

BACKGROUND ART

Recently, frequency-sharing wireless communications have been needed in wireless communication fields. FIG. 20 is a conceptual illustration showing an example of a combination of wireless communication systems sharing frequency bands, i.e. the overall constitution implementing two wireless LAN (Local Area Network) systems having different frequency channels.

In this illustration, the wireless communication system includes wireless LAN stations 2a, 2b and a receiver 1a. The wireless LAN station 2a performs communication using a frequency band CH1 having a center frequency fa. The wireless LAN station 2b performs communication using a frequency band CH5 having a center frequency fb (where fa<fb).

The receiver 1a is arranged at a position, which is reachable by both the wireless signals from the wireless LAN stations 2a, 2b, so as to receive signals in which two wireless signals, i.e. the wireless signal of the center frequency fa and the wireless signal of the center frequency fb, partially overlap with each other.

There are other examples of sharing frequency bands, in which different communication systems share frequencies, such as a combination of a wireless LAN system, Bluetooth (a registered trademark) and WiMax (a registered trademark).

In the case of FIG. 20 in which the receiver 1a assumes the wireless LAN station 2a as a communication target, it is prerequisite for the receiver 1a to precisely receive a desired wave in a frequency-sharing wireless communication in which a transmission frequency band of a desired wave having the center frequency fa partially overlaps with a transmission frequency band of an interference wave having the center frequency fb from the wireless LAN station 2b.

There is a technology (e.g. Non-Patent Document 1) in which a plurality of multicarrier wireless communication systems cooperate with each other and in which different sub-carriers are allocated as sub-carriers having a possibility of interfering with other systems via scheduling and setting so as to improve frequency utilization efficiency in a certain frequency band maintaining a certain level of D/U (Desired to Undesired signal ratio) representing the ratio of intensity between a desired wave and an interference wave, for example.

In addition, a multistage interference cancellation method (e.g. Non-Patent Documents 2, 3) has been developed with respect to a reception signal (D+U1+U2+U3+ . . . ) in which a desired wave D is added to a plurality of interference waves U1, U2, U3, . . . in a receiver side. In this interference cancellation method, interference replicas U1', U2', U3', . . . , i.e. estimate values regarding a plurality of interference waves U1, U2, U3, . . . , are calculated (produced) in advance, whereby the desired wave D is calculated according to the following procedures.

First step: Reception signal (D+U1+U2+U3+ . . . )−interference replica U1'≈signal (D+U2+U3+ . . . )

Second step: Signal (D+U2+U3+ . . . )−interference replica U2'≈signal (D+U3+ . . . )

Third step: Signal (D+U3+ . . . )−interference replica U3'≈signal (D+ . . . )

That is, the receiver successively subtracts the calculated interference replicas U1', U2', . . . from the reception signal (D+U1+U2+U3+ . . . ) so as to calculate the desired wave D.

PRIOR ART DOCUMENT

Non-Patent Documents

Non-Patent Document 1: Jun Mashino, Mamoru Akimoto, Masashi Nakatugawa, "A Study on subcarrier overlapping for OFDMA wireless system", General Meeting Proceedings Collection, the Institute of Electronics, Information and Communication Engineers, B-5-130, March, 2008

Non-Patent Document 2: Mamoru Sawahashi, Kenichi Higuchi et al, "Pilot Symbol-Assisted Coherent Multistage Interference Canceller with Recursive Channel Estimation for DS-CDMA Mobile Radio", Research Report of Institute of Electronic and Information Engineers, Information Theory IT, the Institute of Electronics, Information and Communication Engineers, March of 1996, Vol. 95, No. 591, pp. 101-106

Non-Patent Document 3: Yusuke Asai, Takatoshi Sugiyama et al, "Hierarchical Interface Canceller Using Error Detection and Selection for SDM-COFDM", Research Report of the Institute of Electronics, Information and Communication Engineers, Antenna and Transmission, the Institute of Electronics, Information and Communication Engineers, March of 2003, Vol. 102, No. 671, pp. 111-116

DISCLOSURE OF INVENTION

Problem to be Solved by the Invention

However, there is a problem in that the technology of Non-Patent Document 1 is unable to improve frequency utilization efficiency in a low D/U environment, i.e. in an environment in which an interference wave has the same level as a desired wave or a higher level.

The technologies of Non-Patent Documents 2, 3 are unable to calculate replica signals when the receiver does not recognize the information representing a modulation method, a coding method and an available frequency band with respect to an interference wave subjected to calculation. That is, the receiver needs to implement a function for detecting a communication method of an interference wave and a function for performing the same modulation coding process as the communication method of the interference wave; hence, there is a problem in that the device needs a complex configuration and a large size.

In addition, there is a problem in that a delay time needs to be increased since the amount of calculation becomes enormous due to numerous interference waves included in reception signals. FIG. 21 is an illustration showing a process for subtracting an interference replica of each interference wave. This gives rise to a problem in that interference waves are hardly eliminated solely via the baseband signal processing of a receiver based on the center frequency of a desired wave because, in general, the center frequency of a desired wave differs from the center frequency of an interference wave in an environment causing an overlapping of spectrum on the frequency axis.

The present invention is made to solve the above problems in light of the above circumstances, wherein it is an object of the present invention to provide a reception device and a reception method, each of which is able to reduce the reception error rate irrespective of a power ratio (D/U) between a desired wave and an interference wave in a multicarrier communication system adopting forward error correction codes.

Means for Solving the Problems

A reception method of the present invention is a reception method adapted to a reception device receiving wireless signals in a multicarrier wireless communication system adopting forward error correction codes, which transmits and receives wireless signals constituted of a plurality of sub-carriers, characterized by including: an interference band detection process for selecting sub-carriers causing reception errors from among a plurality of sub-carriers by way of specific sub-carriers; a weight coefficient generation process for generating weight coefficients reducing reliability in sub-carriers with respect to the selected specific sub-carriers compared to other sub-carriers; a demodulation process for demodulating the received wireless signals in sub-carriers; a weighted calculation process for performing weighted calculation applying weight coefficients to demodulated values of sub-carriers of wireless signals; and a decoding process for performing a decoding process for error correction on calculated values in sub-carriers.

A reception method of the present invention is a reception method adapted to a multicarrier wireless communication system adopting forward error correction codes, which receives and transmits wireless signals constituted of a plurality of sub-carriers, characterized by including: an interference band detection process for detecting a frequency band of a sub-carrier susceptible to an interference wave among a plurality of received sub-carriers by way of an interference band, thus outputting interference band information; a weight coefficient generation process for generating weight coefficients for reducing reliability in sub-carriers based on the interference band information with respect to the interference band compared to a frequency band of a sub-carrier insusceptible to the interference wave; a weighted calculation process for performing weighted calculation applying weight coefficients to demodulated values of the sub-carriers; a permutation process for permutating a reproduction signal with respect to a reception signal of the interference band within frequency bands attributed to a plurality of sub-carriers; and a decoding process for performing a coding process for error correction on the sub-carrier of the wireless signal including the permutated frequency band, thus outputting a decoding result and a signal forming the reproduction signal for use in a next stage of the permutation process.

In the reception method of the present invention, the weight coefficient generation process generates a weight coefficient for permutating an average value among candidates of demodulated values with respect to the specific sub-carrier.

In the reception method of the present invention, the interference band detection process detects the specific sub-carrier causing a reception error upon selecting a sub-carrier having a high reception level at a timing precluding a desired wave or based on a measurement result regarding the reception level of the sub-carrier precluding the desired wave.

In the reception method of the present invention, the interference band detection process detects the specific sub-carrier causing a reception error upon selecting a sub-carrier having a high reception level among measured reception levels of wireless signals from a base station different from a base station serving as a communication target of the reception device in frequency bands of sub-carriers attributed to the desired wave serving as a reception target every predetermined period.

In the reception method of the present invention, the interference band detection process calculates a CINR (Carrier to Interference Noise Ratio) value using either a pilot signal of a desired wave or a preamble signal, compares the calculated CINR value with a predetermined value, and selects a sub-carrier whose CINR value is lower than the predetermined value as the specific sub-carrier causing a reception error.

In the reception method of the present invention, the permutation process permutates weight coefficients.

In the reception method of the present invention, the permutation process performs permutation in frequency bands.

In the reception method of the present invention, the decoding process and the permutation process are repeated multiple times with respect to a single reception signal.

In the reception method of the present invention, the decoding process includes a soft decision decoding process for producing a soft decision decoding result via the decoding process for error correction with respect to the input sub-carrier and a hard decision process for defining a decoding result by way of a decision process based on the soft decision decoding result, wherein the permutation process replaces the sub-carrier subjected to the weighted calculation based on the reception signal with a sub-carrier based on the soft decision decoding result serving as the reproduction signal.

The reception method of the present invention further includes a dummy modulation process for reproducing a dummy transmission signal based on the signal forming the reception signal output from the decoding process, wherein the permutation process permutates the sub-carrier, which is subjected to the weighted calculation based on the reception signal, on the basis of a dummy sub-carrier serving as the reproduction signal.

In the reception method of the present invention, the dummy sub-carrier is weighted based on the weight coefficient.

The reception method of the present invention further includes a dummy transmission process for producing a dummy transmission signal based on the signal forming the reproduction signal output from the decoding process, an estimate process for calculating a transmission path estimate value based on the reception signal, and a transmission path coefficient multiplication process for multiplying the dummy transmission signal by the transmission path estimate value, thereby calculating the dummy retransmission signal, wherein the permutation process permutates the reception signal based on the dummy retransmission signal serving as the reproduction signal.

In the reception method of the present invention, the permutation process performs a calculation based on weight coefficients set to the reception signal and the dummy retransmission signal, thus performing a mixing process based on the calculation result.

In the reception method of the present invention, the permutation process performs a mixing process according to any one of a maximum ratio mixing method, a common-mode mixing method, and a selective mixing method.

A reception device of the present invention is a reception device receiving wireless signals in a multicarrier wireless communication system adopting forward error correction codes, which transmits and receives wireless signals constituted of a plurality of sub-carriers, characterized by including: a demodulator for demodulating received wireless signals in sub-carriers; an interference band detector for selecting sub-carriers causing reception errors from among a plurality of sub-carriers by way of specific sub-carriers; a weight coefficient generator for generating weight coefficients reducing reliability in sub-carriers with respect to the selected specific sub-carriers compared to other sub-carriers; a weighted calculation unit for performing weighted calculation applying weight coefficients to demodulated values of sub-carriers of wireless signals demodulated by the demodulator; and a decoder for performing a decoding process for error correction on values calculated by the weighted calculation unit in sub-carriers.

A reception device of the present invention is a reception device adapted to a multicarrier wireless communication system adopting forward error correction codes, which receives and transmits wireless signals constituted of a plurality of sub-carriers, characterized by including: an interference band detector for detecting a frequency band of a sub-carrier susceptible to an interference wave among a plurality of received sub-carriers by way of an interference band, thus outputting interference band information; a weight coefficient generator for generating weight coefficients for reducing reliability in sub-carriers based on the interference band information with respect to the interference band compared to a frequency band of a sub-carrier insusceptible to the interference wave; a weighted calculation unit for performing weighted calculation applying weight coefficients to demodulated values of the sub-carriers; a permutation unit for permutating a reproduction signal with respect to a reception signal of the interference band within frequency bands attributed to a plurality of sub-carriers; and a decoder for performing a forward error correction coding process on the sub-carrier of the wireless signal including the permutated frequency band, thus outputting a decoding result and a signal forming the reproduction signal for use in the permutation unit.

In the reception device of the present invention, the weight coefficient generator generates a weight coefficient for permutating an average value among candidates of demodulated values with respect to the specific sub-carrier.

In the reception device of the present invention, the interference band detector detects the specific sub-carrier causing a reception error upon selecting a sub-carrier having a high reception level at a timing precluding a desired wave or based on a measurement result regarding the reception level of the sub-carrier precluding the desired wave.

In the reception device of the present invention, the interference band detector detects the specific sub-carrier causing a reception error upon selecting a sub-carrier having a high reception level among measured reception levels of wireless signals from a base station different from a base station serving as a communication target of the reception device in frequency bands of sub-carriers attributed to the desired wave serving as a reception target every predetermined period In the reception device of the present invention, the interference band detector calculates a CINR (Carrier to Interference Noise Ratio) value using either a pilot signal of a desired wave or a preamble signal, compares the calculated CINR value with a predetermined value, and selects a sub-carrier whose CINR value is lower than the predetermined value as the specific sub-carrier causing a reception error.

In the reception device of the present invention, the permutation unit permutates weight coefficients.

In the reception device of the present invention, the permutation unit performs permutation in frequency bands.

In the reception device of the present invention, the decoding process and the permutation process are repeated multiple times with respect to a single reception signal.

In the reception device of the present invention, the decoder includes a soft decision decoding unit for producing a soft decision decoding result via the decoding process for error correction with respect to the input sub-carrier and a hard decision unit for defining a decoding result by way of a decision process based on the soft decision decoding result, wherein the permutation unit replaces the sub-carrier subjected to the weighted calculation based on the reception signal with a sub-carrier based on the soft decision decoding result serving as the reproduction signal.

The reception device of the present invention further includes a dummy modulation unit for reproducing a dummy transmission signal based on the signal forming the reception signal output from the decoder, wherein the permutation unit permutates the sub-carrier, which is subjected to the weighted calculation based on the reception signal, on the basis of a dummy sub-carrier serving as the reproduction signal.

In the reception device of the present invention, the dummy sub-carrier is weighted based on the weight coefficient.

The reception device of the present invention further includes a dummy transmission unit for producing a dummy transmission signal based on the signal forming the reproduction signal output from the decoder, an estimate unit for calculating a transmission path estimate value based on the reception signal, and a transmission path coefficient multiplication unit for multiplying the dummy transmission signal by the transmission path estimate value, thereby calculating the dummy retransmission signal, wherein the permutation unit permutates the reception signal based on the dummy retransmission signal serving as the reproduction signal.

In the reception device of the present invention, the permutation unit performs a calculation based on weight coefficients set to the reception signal and the dummy retransmission signal, thus performing a mixing process based on the calculation result.

In the reception device of the present invention, the permutation unit performs a mixing process according to any one of a maximum ratio mixing method, a common-mode mixing method, and a selective mixing method.

Effect of the Invention

According to the present invention, the reception device selects a sub-carrier having low reliability and causing a reception error as a specific sub-carrier; it calculates a weight coefficient for reducing reliability of a demodulated value of the selected sub-carrier; thereafter, it performs weighted calculation on the demodulated value of the specific sub-carrier by use of the weight coefficient. That is, the reception device performs weighted calculation on demodulated values in light of their reliability; it masks specific sub-carriers having low reliability whilst it decodes reception signals by use of demodulated values having high reliability; thus, the present invention present an advantage in that it is able to improve a reception error correcting ability.

According to the present invention, the reception method is able to adopt forward error correction codes and is therefore applicable to a multicarrier wireless communication system for receiving and transmitting wireless signals composed of a plurality of sub-carriers. A frequency band of sub-carriers susceptible to interference waves among a plurality of received sub-carriers is detected as an interference band. In addition, weighted calculations are performed on demodulated values of sub-carriers by use of weight coefficients for reducing reliability with respect to the interference band compared to the frequency band of sub-carriers insusceptible to interference waves. Furthermore, a decoding process for error correction is performed on sub-carriers of wireless signals of frequency bands which are substituted for signals attributed to the interference band. Based on the decoding result of error correction, reproduction signals are produced by repeatedly performing the permutation process on the interference band. Thus, it is possible to output the result of the repeatedly performed error correction process.

In the multicarrier wireless communication system adopting forward error correction codes, it is possible to replace signals of sub-carriers embracing interference waves included in desired reception signals with reproduction signals formed based on reception signals. This makes it possible to demodulate multicarrier signals composed of reception signals precluding interference waves and substitute reproduction signals.

Since the permutation process is able to reduce an influence of interference waves, it is possible to reduce a reception error rate irrespective of a power ratio (D/U) between desired waves and interference waves, the type of forward error correction codes and the decoding method.

In the present invention, the permutation process is introduced to permutate weight coefficients.

Since the permutation process is performed using weighted calculation, it is possible to reduce the amount of processing in the permutation process.

In the present invention, the permutation process is performed in frequency bands.

Since the permutation process is performed in frequency bands of sub-carriers, it is possible to reduce the amount of processing in the permutation process.

In the present invention, the decoding process and the permutation process are repeated multiple times with respect to a single reception signal.

Thus, it is possible to reduce the influence of interference waves by way of the decoding process and the permutation process which are repeatedly performed.

In the present invention, the decoding process performs a soft decision decoding process implementing forward error correction decoding on input sub-carriers; subsequently, it performs a hard decision process which defines the decoding result by way of a decision process based on the soft decision decoding result. The permutation process replaces sub-carriers, subjected to weighted calculation based on reception signals, with sub-carriers based on the soft decision decoding result representing reproduction signals.

Since the soft decision decoding result can be represented by continuous values, it is possible to permutate sub-carriers of wireless signals received using those values. Thus, it is possible to reduce the influence of interference waves upon replacing reception signals of frequency bands susceptible to interference waves with the soft decision decoding result.

In the present invention, dummy transmission signals are reproduced based on output signals of the decoding process; subsequently, dummy sub-carriers are produced based on dummy transmission signals. The permutation process replaces sub-carriers, subjected to weight calculation based on reception signals, with dummy sub-carriers.

Since the dummy modulation process and the dummy demodulation process are performed based on the hard decision decoding result, it is possible to obtain reception signals assuming variations of signals undergoing an ideal transmission; this makes it possible to permutate sub-carriers by use of wireless signals received using those values. Thus, it is possible to reduce the influence of interference waves upon replacing reception signals of frequency bands susceptible to interference waves with the soft decision decoding result.

In the present invention, dummy sub-carriers are weighted based on weight coefficients.

Since dummy sub-carriers substituting for sub-carriers of reception signals are weighted based on weight coefficients, it is possible to adjust the relationship between reception signals and substitute reception signals in terms of reliability. Thus, it is possible to improve the reproducibility of substituted signals and to thereby reduce the influence of interference waves.

In the present invention, dummy transmission signals are produced based on output signals of the decoding process; subsequently, dummy transmission signals are multiplied by calculated transmission path estimate values so as to calculate dummy retransmission signals. The permutation process permutates reception signals based on dummy retransmission signals serving as reproduction signals.

Since a propagation distortion of reception signals can be estimated using transmission path estimate values, it is possible to reproduce permutated dummy retransmission signals with a high fidelity. Thus, it is possible to reduce the influence of interference waves upon improving reproducibility of signals during permutation.

In the present invention, the permutation process is performed via calculation based on weight coefficients set to reception signals and dummy retransmission signals, wherein a mixing process is performed based on the calculation result.

Thus, it is possible to produce mixed signals by use of the information of reception signals and the information of dummy retransmission signals. Upon selecting either one, it is possible to produce mixed signals without causing a deficiency of information, whereby it is possible to reduce the influence of interference waves upon improvement of reproducibility of signals during mixing.

In the present invention, the mixing process conducted in the permutation process is performed in accordance with any one of the maximum ratio mixing method, the common-mode mixing method and the selective mixing method.

This makes it possible to perform the permutation process prior to the demodulation process; hence, it is possible to implement the present invention without substantially modifying the generally-known constitutions of demodulators and decoders.

In the permutation process, it is possible to achieve the processing for reducing the influence of interference waves in the interference band by way of the mixing process, which can be selected from among a plurality of mixing methods.

MODES FOR CARRYING OUT THE INVENTION

First Embodiment

Figure 1:
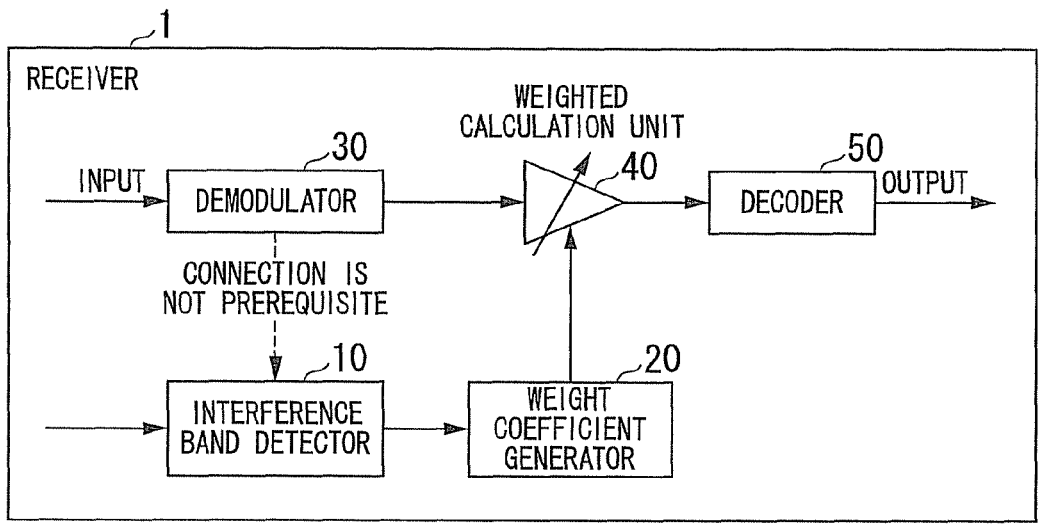
FIG. 1 A block diagram showing the internal constitution of a receiver 1 according to one embodiment of the present invention.

Hereinafter, a receiver 1 according to a first embodiment of the present invention will be described with reference to FIG. 1. FIG. 1 is a block diagram showing the outline of the receiver 1 of the present embodiment. The receiver 1 is constituted of an interference band detector 10, a weight coefficient generator 20, a demodulator 30, a weighted calculation unit 40, and a decoder 50, wherein signals included in desired waves are extracted from reception signals consisting of desired waves and interference waves by use of forward error correction codes.

Next, the internal constitution of the receiver 1 will be described.

Upon establishment of a local station facilitating FWA (Fixed Wireless Access) with the receiver 1, the interference band detector 10 detects frequency bands, which may interfere with wireless signals transmitted from the other system, among available frequency bands in desired waves of the local station.

The interference band detector 10 transmits a suspension request for transmission of wireless signals via desired waves to a transmission-source wireless station using desired waves, for example; in an environment having no desired waves transmitted, the interference band detector 10 detects the nonexistence/existence and signal intensity of other wireless signals, thus detecting sub-carriers causing interference. The interference band detector 10 generates a string of specific sub-carrier decision values by way of a string of interference band decision values in which "1" is assigned to a specific sub-carrier whilst "0" is assigned to sub-carriers other than the specific sub-carrier. The interference band detector 10 outputs the detection result to the weight coefficient generator 20.

The weight coefficient generator 20 calculates weight coefficients of sub-carriers in connection with a specific sub-carrier decision value. The weight coefficients calculated by the weight coefficient generator 20 are weight coefficients for reducing reliability with respect to sub-carriers causing interference detected by the interference band detector 20 compared to other sub-carriers. The weight coefficient generator 20 outputs a string aligning calculated weight coefficients of sub-carriers to the weighted calculation unit 40.

The demodulator 30 converts received wireless signals including desired waves subjected to forward error correction coding into electric signals of sub-carriers, thus outputting demodulated values of sub-carriers to the weighted calculation unit 40.

The weighted calculation unit 40 performs weighted calculation processes on demodulated values output from the demodulator 30 based on weight coefficients received from the weighted calculation generator 20 in sub-carriers, thus outputting string aligning calculation results of sub-carriers to the decoder 50 as a likelihood data string.

The decoder 50 performs error correction processes and decoding processes so as to capture signals of desired waves based on the likelihood data string from the weighted calculation unit 40.

Figure 2:
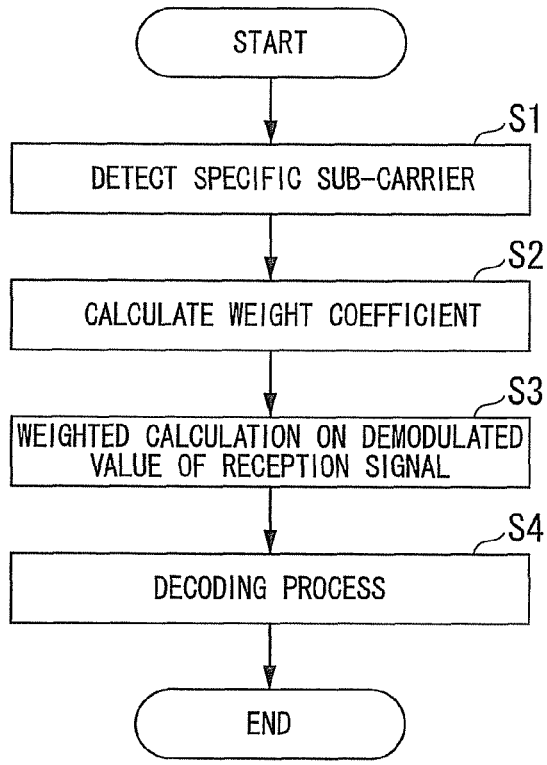
FIG. 2 A drawing showing a flow of processes in the receiver 1 of the embodiment.

Next, the operation of the receiver 1 according to the first embodiment of the present invention will be described with reference to FIG. 2. FIG. 2 is an illustration showing a flow of processes of the receiver 1.

Upon establishment of a local station with the receiver 1, the interference band detector 10 measures and detects reception levels, frequency bands, center frequencies and overlap bands with desired waves from wireless signals of sub-carrier frequency bands of desired waves at the timing having no desired waves and in sub-carrier frequency bands having no desired waves, thus capturing the information regarding interference waves (i.e. interference band information).

In addition, the interference band detector 10 selects (or detects) specific sub-carriers, i.e. sub-carriers having interference waves, based on the information of captured interference waves. For instance, the interference wave detector 10 detects specific sub-carriers, i.e. sub-carriers of frequency bands having a predetermined reception level or higher based on reception levels.

Figure 3:
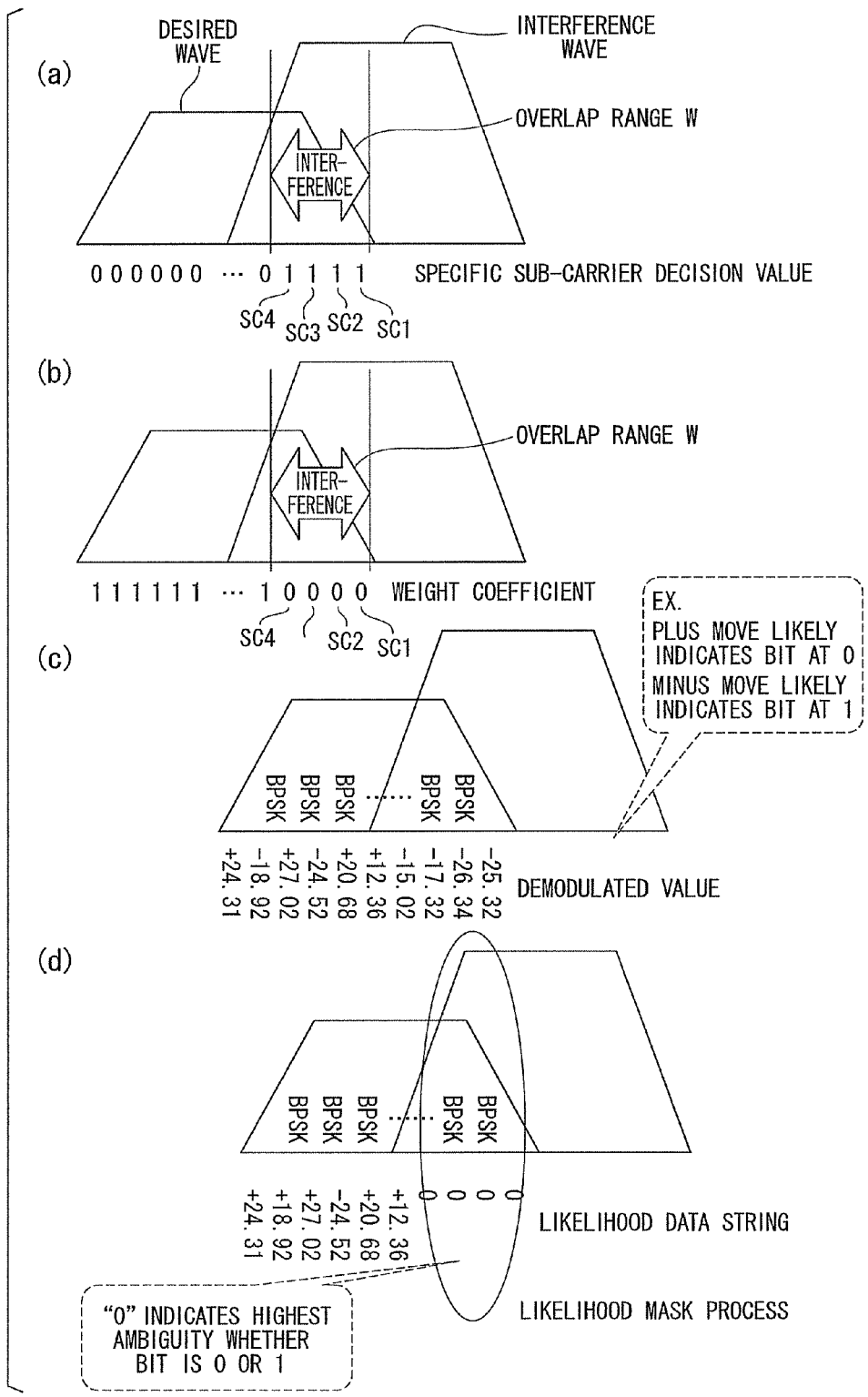
FIG. 3 Conceptual illustrations showing the operation of the receiver 1 of the embodiment.

FIG. 3 show conceptual illustrations with respect to the contents of processing of the receiver 1. In FIG. 3(a), the interference band detector 10 detects specific sub-carriers, i.e. sub-carriers SC1 through SC4 included in an overlap band W (an interference band) in which a desired wave overlaps with an interference wave. The interference band detector 10 generates a string of specific sub-carrier decision values in which "1" is assigned to the sub-carriers SC1 through SC4 whilst "0" is assigned to other sub-carriers.

Referring back to FIG. 2, the interference band detector 10 outputs the generated string of specific sub-carrier decision values to the weight coefficient generator 20 (step S1).

Based on the specific sub-carrier decision values generated by the interference band detector 10, the weight coefficient generator 20 generates weight coefficients for reducing reliability with respect to specific sub-carriers compared to other sub-carriers. This weight coefficient is a weight coefficient, for example, with which a demodulated value is converted into "0" with respect to a sub-carrier assigned with "1" within a string of specific sub-carrier decision values.

The weight coefficient generator 20 outputs a string of weight coefficients generated in sub-carriers to the weighted calculation unit 40 (step S2).

In the present embodiment, the above process of steps S1, S2 are performed prior to reception of signals. Next, a reception process of wireless signals via desired waves will be described. The demodulator 30 demodulates wireless signals having frequency bands of desired waves in sub-carriers, thus outputting digital data of demodulated values of sub-carriers to the weighted calculation unit 40.

The weighted calculation unit 40 performs weighted calculation according to a calculation method adapted to a coding method of desired waves based on weight coefficients and demodulated values of sub-carriers, thus outputting a string of calculation results, i.e. a string of likelihood data, to the demodulator 50 (step S3).

As weighted calculation methods adapted to coding methods, a weight calculation method adapted to a soft decision positive/negative multi-valued coding method of desired waves will be described with reference to FIG. 3B(b) through FIG. 3(d). The soft decision positive/negative multi-valued coding method employs a decoding process handling the positive/negative multi-valued output regarding demodulated values of reception signals, wherein the decoding process determines a negative value as "+" and a positive value as "−1" with reference to a reliability (or a likelihood representing a probability of values) commensurate with an absolute value.

FIG. 3(b) is an illustration showing weight coefficients of sub-carriers. FIG. 3(c) is an illustration showing demodulated values of sub-carriers with respect to the positive/negative multi-valued output. In this illustration, a sub-carrier having a highest positive value of "+27.02" presents a highest reliability indicating a highest likelihood as "−1". On the other hand, a sub-carrier having a lowest negative value of "−26.34" presents a highest reliability indicating a highest likelihood as "+1".

A sub-carrier having a demodulated value 0, i.e. a minimum absolute value, presents a highest ambiguity (or a lowest reliability) as to either "+1" or "−1".

Therefore, in step S2 of FIG. 2, the weighted calculation unit 40 performs weighted calculation based on weight coefficients calculated by the weight coefficient generator 20 so as to convert demodulated values of the sub-carriers SC1 through SC4 serving as specific sub-carriers, into "0", whereby it is possible to reduce reliability with respect to the demodulated values of the sub-carriers SC1 through SC4. As shown in FIG. 3(b), the weight coefficient generator 20 generates a string of weight coefficients by way of logical negation values for specific sub-carrier decision values shown in FIG. 3(a).

As an example of a weighted calculation performed by the weighted calculation unit 40, the weighted calculation unit 40 multiplies demodulated values of FIG. 3(C), by weight coefficients, serving as logical negation values for specific sub-carrier decision values shown in FIG. 3(b), in connection with sub-carriers. Specifically, with respect to a sub-carrier SC1 serving as a specific sub-carrier, the weighted calculation unit 40 multiplies a demodulated value "−25.32" by a weight coefficient "0", thus outputting a multiplication result "0" to the decoder 50 as a weighted-calculation-implemented demodulated value. Similarly, with respect to other sub-carriers other than specific sub-carriers, demodulated values are each multiplied by the weight coefficient "1", so that a string of multiplication results produced for all the sub-carriers is output to the decoder 50 as a string of likelihood data.

FIG. 3(d) is an illustration showing a string of likelihood data which are produced via weighted calculation using weight coefficients and positive/negative multi-valued demodulated values of sub-carriers. As shown in this illustration, weighted-calculation-implemented likelihood data regarding the specific sub-carriers SC1 through SC4 present the lowest reliability "0", whilst other demodulated values are not changed.

Referring back to FIG. 2, the decoder 50 performs a decoding process adapted to the coding method of desired waves based on a string of likelihood data from the weighted calculation unit 40. As a forward error correction coding method adapted to desired waves, it is possible to adopt a convolutional coding method or a method combining repetitive decoding and turbo coding (step S4).

According to the present embodiment, upon establishment of a local station with the receiver 1, the interference wave detector 10 measures interference waves in a frequency band of a desired wave in advance; the weight coefficient generator 20 calculates weight coefficients for reducing reliability with respect to specific sub-carriers having interference waves of reception signals based on the measurement result; subsequently, the weighted calculation unit 40 processes demodulated values of reception signals based on weight coefficients, thus reducing the reliability of specific sub-carriers.

Thus, the receiver 1 performs weighted calculation on demodulated signals in response to the reliability of reception signals of sub-carriers; it masks specific sub-carriers having a low reliability while decoding reception signals by use of demodulated values of sub-carriers having a high reliability; hence, it is possible to improve the reception error correcting ability. In addition, it presents an effect enabling a high coding rate transmission prioritizing sub-carriers having no interference waves.

In addition, the present embodiment is able to decode signals of desired waves from reception signals irrespective of frequency bands of interference waves, the number of interference waves, and communication method.

For this reason, the present embodiment presents an effect preventing the receiver 1 from being equipped with a complex configuration because there is no need to introduce a configuration generating interference wave replicas in connection with center frequency bands of interference waves and communication methods. In addition, the present embodiment does not need to repeatedly perform the process for subtracting interference wave replicas from reception signals many times corresponding to the number of interference waves, but the present embodiment is able to output a string of likelihood having the decoder 50 decode signals of desired waves from reception signals upon one-time weight calculation; hence, it is possible to realize a communication method having reduced transmission delays.

The present embodiment illustrates that the weight coefficient generator 20 calculates weight coefficients, i.e. logical negation values or binary values representing specific sub-carrier decision values serving as mask bits in the interference band detector 10; but this is not a restriction; hence, it is possible to use the following coefficients.

Figure 4:
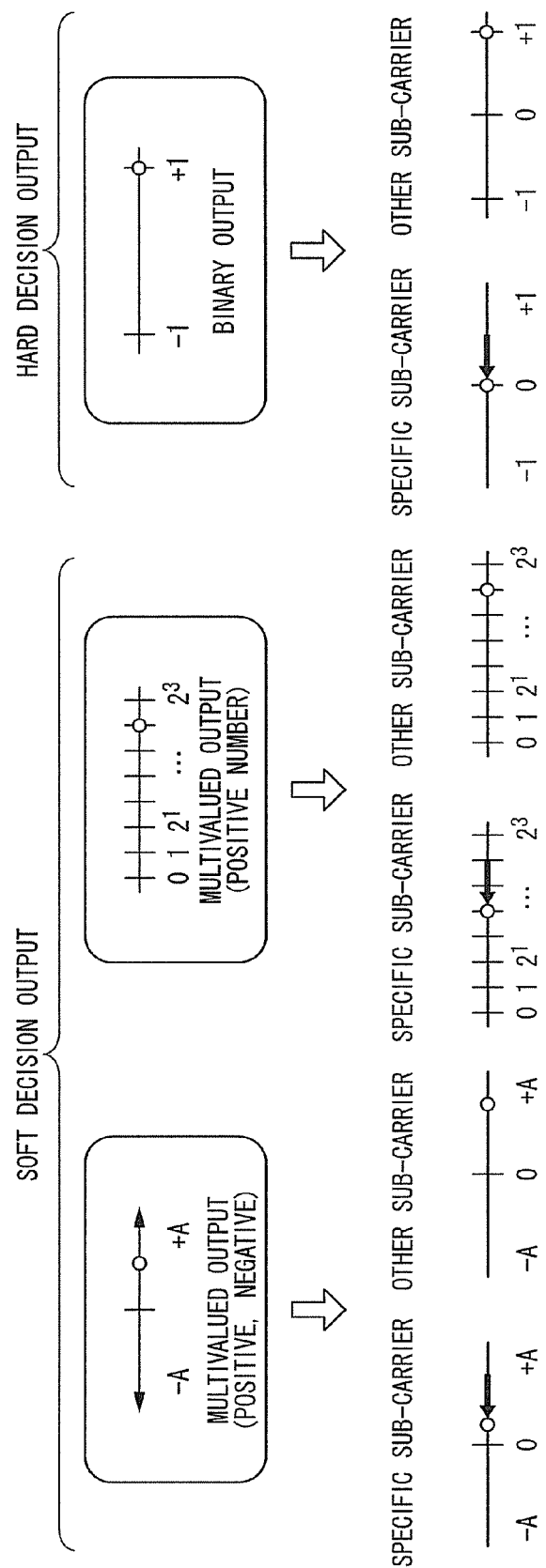
FIG. 4 Illustrations showing examples of weighting operations in the embodiment.

FIG. 4 shows a soft decision output, in which, with respect to the positive/negative multi-valued output consisting of demodulated values, for example, the weight coefficient generator 20 calculates a predetermined value α (where $0 \leq \alpha < 1$) as weight coefficients for specific sub-carriers while calculating a weight coefficient 1 for other sub-carriers.

The weighted calculation unit 40 multiplies demodulated values of specific sub-carriers by the predetermined value cc so as to convert absolute values of demodulated values of specific sub-carriers in a direction toward zero, thus reducing reliability.

In the case of the soft decision output handling positive/negative multi-valued demodulated values, demodulated values close to zero are each decoded into a bit value "−1" whilst demodulated values close to the maximum value are each decoded into a bit value "1". In this case, the weight coefficient generator 20 can calculate weight coefficients for replacing demodulated values of specific sub-carriers with the center value among candidate values (e.g. a center value 3 or 4 among candidate values 0 through 7).

In the case of the hard decision output serving as a binary output handling "−1" and "+1", the weight coefficient generator 20 can output weight coefficients of specific sub-carriers for replacing binary demodulated values with "0" to the weight calculation unit 40.

The present embodiment adopts forward error correction coding such as block coding; hence, in the communication system in which, even though a part of demodulated value of sub-carriers fails, it is possible to capture signals of desired waves based on demodulated values of other sub-carriers, it is possible to improve the reception error correcting ability by performing weighted calculation using weight coefficients for reducing reliability on demodulated values with respect to sub-carriers having a low reliability causing an error.

Figure 5:
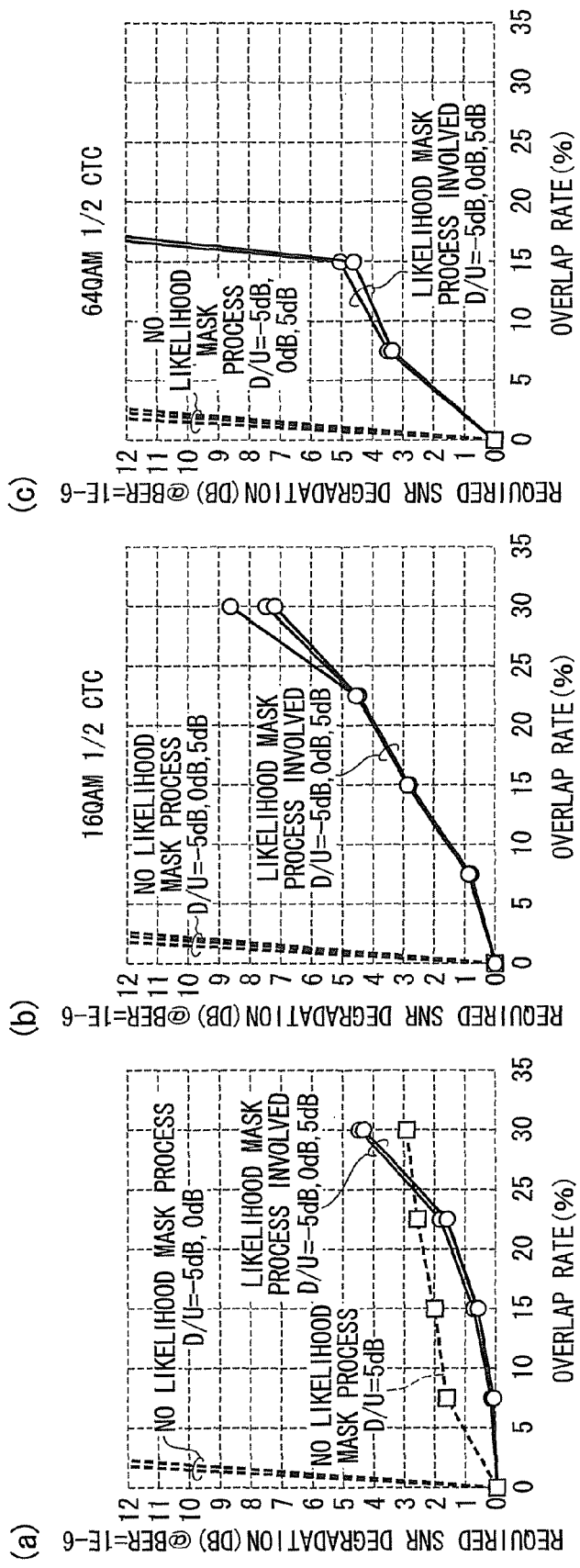
FIG. 5 Graphs for comparing desired SNR values owing to the adoption of a likelihood mask process in the embodiment of each modulation method.

FIG. 5 shows graphs representing desired SNR (Signal to Noise Ratio) according to modulation methods with respect to the case adopting a likelihood mask process of the present embodiment and the other case not adopting the likelihood mask process. In graphs, the vertical axis represents SNR values, which are needed to decode signals of desired waves from reception signals, in units of dB (decibel). An SNR value "γ" represents that the reception level of a desired wave needs to be increased by the γ-th power of 10 ($10^\gamma$) compared to the reception level of noise (e.g. an interference wave). That is, higher desired SNR values indicate susceptibility to noise such as interference waves.

In graphs, the horizontal axis represents an overlap rate in units of percents (%), i.e. a ratio of a frequency band of a specific sub-carrier likely overlapped with an interference wave within the overall frequency range including all sub-carriers of a desired wave. That is, higher overlap rates indicate a high rate of sub-carriers susceptible to interference waves.

In graphs, the following communication methods are adapted to desired waves. As a primary modulation, it is possible to adopt any one of QPSK (Quadrature Phase Shift Keying), 16QAM (Quadrature Amplitide Modulation), and 64QAM. As a secondary modulation, it is possible to adopt an OFDM (Orthogonal Frequency Division Multipexing). As forward error correction coding, it is possible to adopt a CTC (Convolutional Turbo Code) combining convolutional coding and turbo coding. A coding rate is set to ½.

FIG. 5(a), (b), (c) show graphs adopting QPSK, 16QAM, and 64QAM as a primary modulation.

In the graph of FIG. 5(a), regarding the case adopting no likelihood mask process, low D/U values such as "−5 dB" and "0 dB" need signals of high SNR values even when their overlap rates are low. This indicates a significant susceptibility to noise such as interference waves. Regarding the case adopting the likelihood mask process, all the D/U values such as "−5 dB, 0 dB, 5 dB" roughly have the same SNR values in connection with the overlap rate; this indicates a capability of receiving signals of desired waves not depending upon D/U values.

A comparison is made between the case adopting the likelihood mask process and the case adopting no likelihood mask process when desired waves have a high signal level with a D/U value "5 dB", wherein the case adopting the likelihood mask process has a low SNR value with an overlap rate of 25% or less, which generally indicates a capability of reducing the desired SNR value by use of the likelihood mask process of the present invention.

In the modulation method of 16QAM of FIG. 5(b) and the modulation method of 64QAM of FIG. 5(c), roughly the same SNR value is secured irrespective of D/U values in connection with each overlap rate in both the case adopting no likelihood mask process and the case adopting the likelihood mask process; this indicates no D/U dependency. However, in both modulation methods, a smaller SNR value is secured with respect to the case adopting the likelihood mask process compared to the case adopting no likelihood mask process. Therefore, in both modulation methods, it is possible to reduce the desired SNR value upon adopting the likelihood mask process. In both cases, the desired SNR value is stabilized in connection with each overlap rate, which indicates a high resistance to the overlap rate with interference waves.

Figure 6:
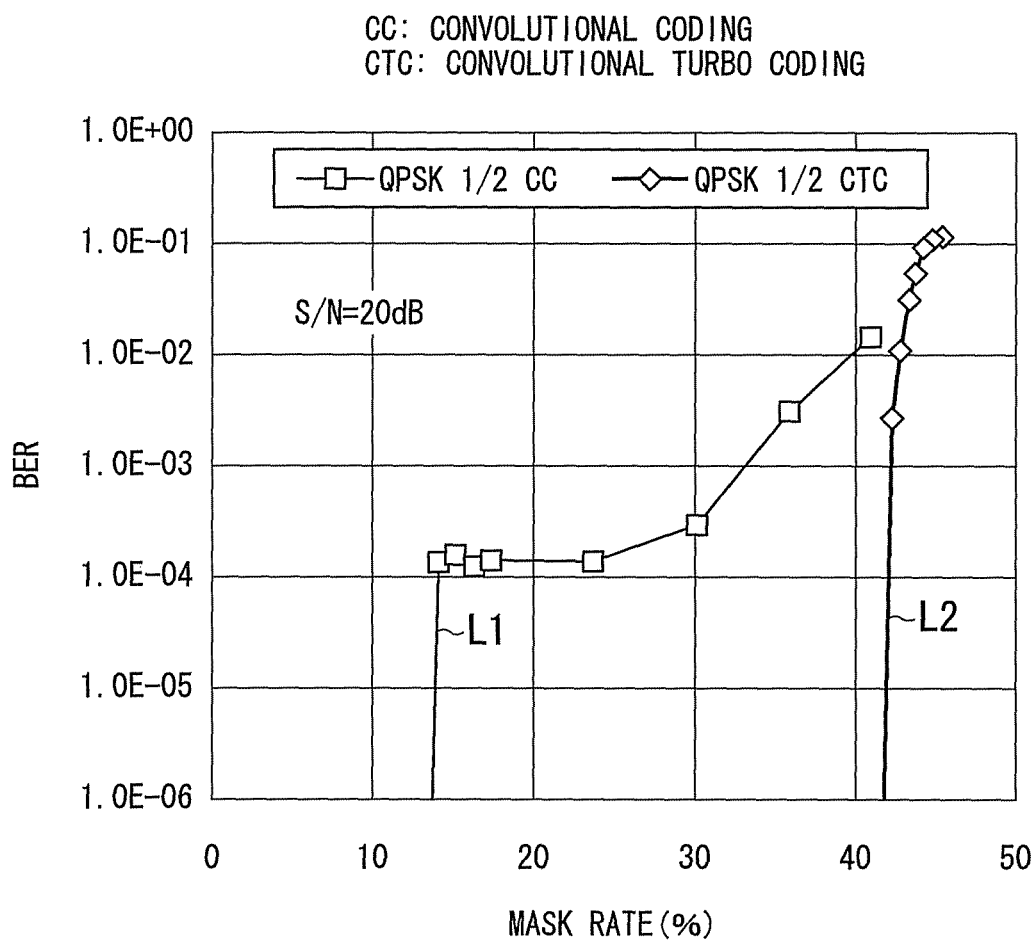
FIG. 6 A graph showing a coding error rate in the embodiment.

FIG. 6 is a graph showing a reception error rate detected in the case adopting the likelihood mask process of the present embodiment and a reception error rate detected in the case adopting no likelihood mask process. In the graph, the vertical axis represents a bit error rate (BER) in units of dB (decibel). Herein, 1.0E-β (where (β=0, 1, 2, 3, . . . ) indicates a single bit error of data (a reception error) found among data whose number is β-th power of 10 ($10^\beta$). That is, a higher BER indicates a higher bit error rate.

In the graph, the horizontal axis represents Mask Rate, i.e. a likelihood mask rate, in units of percents (%). The likelihood mask rate is a percentage of the number of specific sub-carriers within the total number of sub-carriers of desired waves. That is, a higher likelihood mask rate indicates a lower rate of sub-carriers having low reliability.

In the graph of FIG. 6, a broken line L1 is formed to plot bit error rates in a communication system adopting QPSK convolutional codes. A broken line L2 is formed by plotting bit error rates in a CTC communication system combining the QPSK convolutional coding and turbo coding.

As shown in the graph, both communication systems have a bit error rate (BER) of 1.0E-3 or less in a certain range of a likelihood mask rate at 30% or less. In the broken line L2, the bit error rate is 1.0E-6 or less when the likelihood mask rate is 40% or less; thus, it is possible to greatly reduce the bit error rate. As described above, the present embodiment is preferably adapted to the foregoing communication systems combining processes repeating decoding, such as convolutional coding and turbo coding.

Second Embodiment

Next, a second embodiment will be described in terms of another example of the first embodiment. The present embodiment differs from the first embodiment in that the processes of steps S1, S2 shown in FIG. 2 are not performed upon establishment of a local station, but interference waves are detected periodically.

Specifically, the interference band detector 10 of the receiver 1 detects wireless signals transmitted from the other system with respect to the overall frequency range of each desired wave at the timing having no desired wave every predetermined period or with respect to frequency bands of sub-carriers having no desired wave.

When the receiver 1 receives wireless LAN signals, for example, the interference band detector 10 may monitor available channels (available frequency bands) of access points (AP) other than an AP transmitting desired waves.

Similar to the foregoing procedures, the interference band detector 10 generates a string of specific sub-carrier decision values based on the detection result so as to output it to the weight coefficient generator 20, so that the weight coefficient generator 20 calculates weight coefficients of sub-carriers so as to output them to the weighted calculation unit 40.

According to the second embodiment, it is possible to perform weighted calculation on demodulated values by use of weight coefficients, which are calculated based on interference waves measured every predetermined period, instead of fixed weight coefficients using specific sub-carrier decision values based on interference waves measured upon establishment of a local station.

Figure 7:
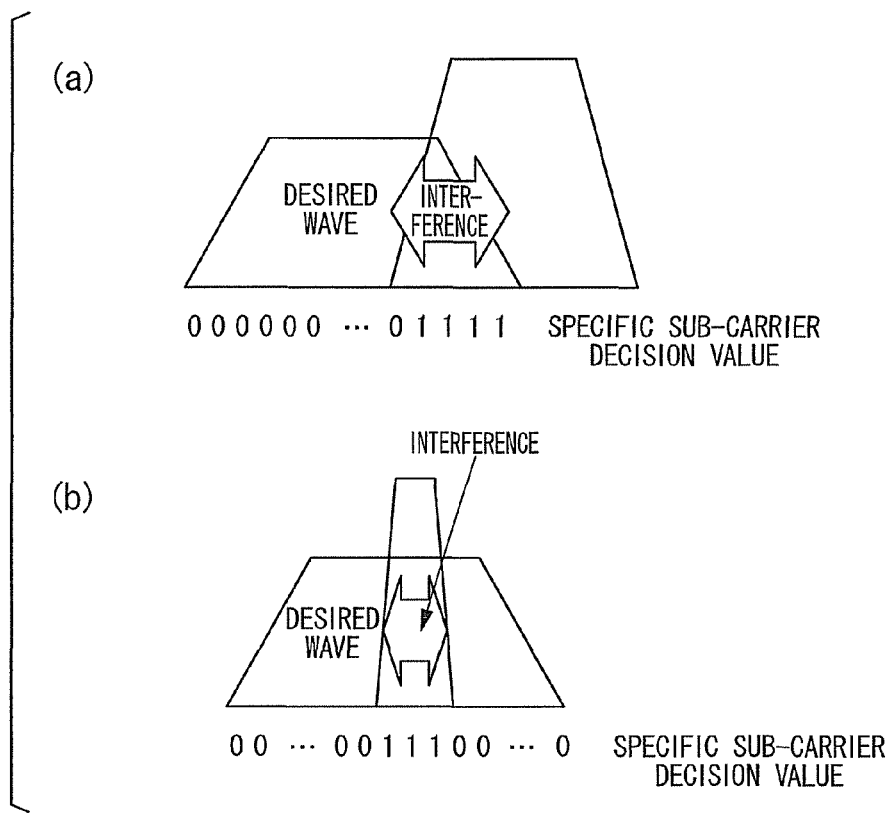
FIG. 7 Illustrations showing examples of time-related variations of interference waves in a second embodiment.

Thus, even when interference waves vary relative to desired waves over a lapse of time, it is possible to calculate weight coefficients reflecting variations of interference waves; hence, it is possible to reduce the reception error rate. FIG. 7 shows illustrations regarding an example of time-related variations of interference waves. For example, the interference band detector 10 detects an interference wave shown in FIG. 7(a) upon establishment of a local station using the receiver 1; thereafter, even when the interference wave varies as shown in FIG. 7(b), the interference wave detector 10 is able to generate a string of specific sub-carrier decision values adapted to the range of the frequency band of the interference wave; hence, it is possible to perform weighted calculation reflecting variations of interference waves.

Third Embodiment

Next, a third embodiment will be described in terms of another example of the foregoing embodiment. The present embodiment differs from the first embodiment in terms of the method for detecting specific sub-carriers.

Figure 8:
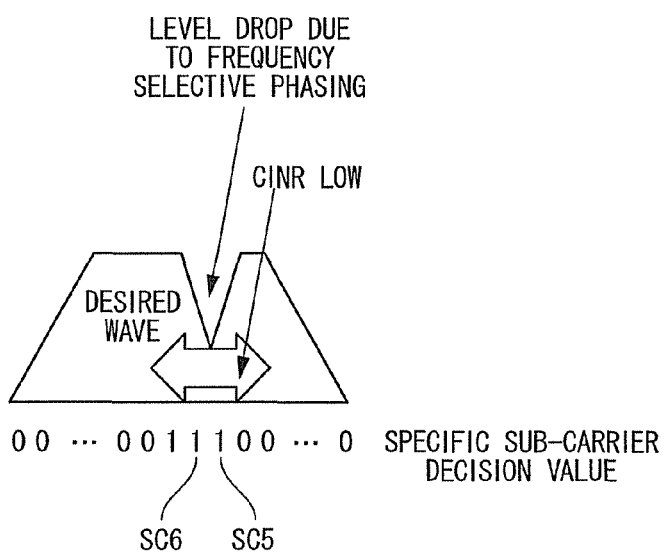
FIG. 8 An illustration showing an example of a desired wave undergoing a signal-level drop owing to frequency selective phasing in a third embodiment.

FIG. 8 show an example of sub-carriers which are detected as specific sub-carriers in the present embodiment. In this illustration, sub-carriers SC5, SC6 are sub-carriers whose signal levels (power values) are significantly weaken in a part of frequency components owing to the frequency selective phasing. The present embodiment detects these sub-carriers SC5, SC6, i.e. sub-carriers having a low CINR (Carrier to Interference Noise Ratio: a ratio of a carrier level to an interference signal level and a noise level) decreasing a signal level in a part of desired waves, by way of specific sub-carriers.

Figure 9:
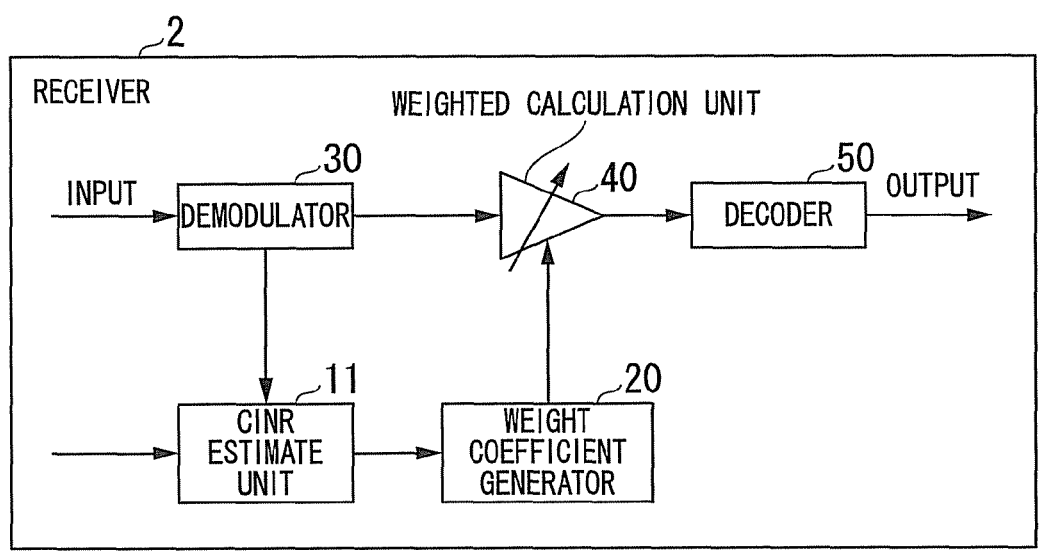
FIG. 9 A block diagram showing the internal constitution of a receiver 2 in the embodiment.

FIG. 9 is an illustration showing the internal constitution of a receiver 2 according to the present embodiment. Herein, the same constitution as the receiver 1 shown in FIG. 1 is designated by the same reference numeral; hence, a distinctive constitution will be described. In the illustration, the present embodiment differs from the first embodiment in that the receiver 2 includes a CINR estimate unit 11 instead of the interference wave detector 10 of the receiver 1.

In the receiver 2, the CINR estimate unit 11 calculates CINR estimate values for sub-carriers of reception signals with respect to already-known signals, such as pilot signals of desired waves and preamble signals, which have been recognized in advance and included in desired waves upon establishment of a local station using the receiver 2.

The CINR estimate unit 11 selects sub-carriers whose CINR estimate values are lower than the predetermined threshold by way of specific sub-carriers based on the measurement result; subsequently, it generates a string of specific sub-carrier decision values based on the selection result, thus outputting the generated string of specific sub-carrier decision values to the weight coefficient generator 20.

As the predetermined threshold used for the specific sub-carrier selecting process by the CINR estimate unit 11, for example, an average value is calculated among CINR estimate values for all sub-carriers of desired waves, so that the predetermined threshold is produced by multiplying the calculated average value by a predetermined rate.

According to the present embodiment, the CINR estimate unit 11 of the receiver 2 determines a sub-carrier whose signal level is decreased (or dropped) as a specific sub-carrier; this allows a decoding process reducing reliability to be performed on the sub-carrier having a decreased signal level causing degradation of reliability of reception signals. This brings out an effect in which the reception error rate can be reduced with respect to reception signals causing the frequency selective phasing.

Fourth Embodiment

Next, a fourth embodiment will be described in terms of another example of the third embodiment. The present embodiment differs from the third embodiment in that the CINR estimate unit 11 does not operate upon establishment of a local station but periodically detects sub-carriers having a low CINR.

Specifically, the CINR estimate unit 11 of the receiver 2 calculates CINR estimate values every predetermined period with respect to pilot signals and preamble signals based on the overall frequency band of desired waves. Similar to the foregoing procedures, the CINR estimate unit 11 generates and outputs a string of specific sub-carriers to the weight coefficient generator 20 on the basis of the detection result, so that the weight coefficient generator 20 calculates and outputs weight coefficients to the weighted calculation unit 40.

According to the fourth embodiment, it is possible to perform weighted calculation on demodulated values by use of weight coefficients, which are calculated based on CINR estimate values calculated every predetermined period, instead of fixed weight coefficients using specific sub-carrier decision values based on CINR estimate values upon establishment of a local station. Thus, even when frequency bands of desired waves decreased in signal levels vary over a lapse of time, it is possible to calculate weight coefficients reflecting variations, which bring out an effect in which the reception error rate can be decreased.

The weighted processing of the weighted calculation unit 40 performed with respect to all sub-carriers; but this is not a restriction; hence, it is possible to perform calculation processes in order to reduce reliability based on weight coefficients with respect to specific sub-carriers alone.

In addition to the foregoing method for multiplying demodulated values by weight coefficients, the weighted processing conducted by the weight coefficient generator 20 and the weighted calculation unit 40 can be performed in such a way that the weight coefficient generator 20 generates a table connecting converted values via bit shifts or via predetermined demodulated values of specific sub-carriers; the weighted calculation unit 40 uses this table as a lookup table so as to convert demodulated values of specific sub-carriers.

The foregoing embodiment is described such that both the specific sub-carrier decision values, which are produced by the interference band detector 10 and the CINR estimate unit 11, and the weight coefficients generated by the weight coefficient generator 20 are binary values which are set to "0" or "1"; but this is not a restriction; hence, it is possible to use multiple values. A specific example will be described with respect to the case in which the interference band detector 10 (or the CINR estimate unit 11) generates a string of specific sub-carrier decision values by use of five-stage values based on the reliability, for example, based on D/U values between desired waves and interference waves.

The interference band detector 10 may generate a string of specific sub-carrier decision values in which "0" is assigned to sub-carriers having no interference waves; "0.25" is assigned to specific sub-carriers with D/U values of 5 dB or more; "0.5" is assigned to specific sub-carriers with D/U values higher than 0 dB and lower than 5 dB; "0.75" is assigned to specific sub-carriers with D/U values higher than −5 dB and lower than 0 dB; and "1" is assigned to specific sub-carriers with D/U values lower than −5 dB. Any types of methods for generating specific sub-carrier decision values can be adopted in connection with specific sub-carrier decision values reflecting reliability such as signal levels interference values other than D/U values.

In addition, the weight coefficient generator 20 may calculate different multi-valued weight coefficients of specific sub-carriers based on multi-valued specific sub-carrier decision values generated by the interference band detector 10 reflecting reliability.

Fifth Embodiment

Hereinafter, a receiver (hereinafter, referred to as a "reception device") according to one embodiment of the present invention will be described with reference to the drawings.

Figure 10:
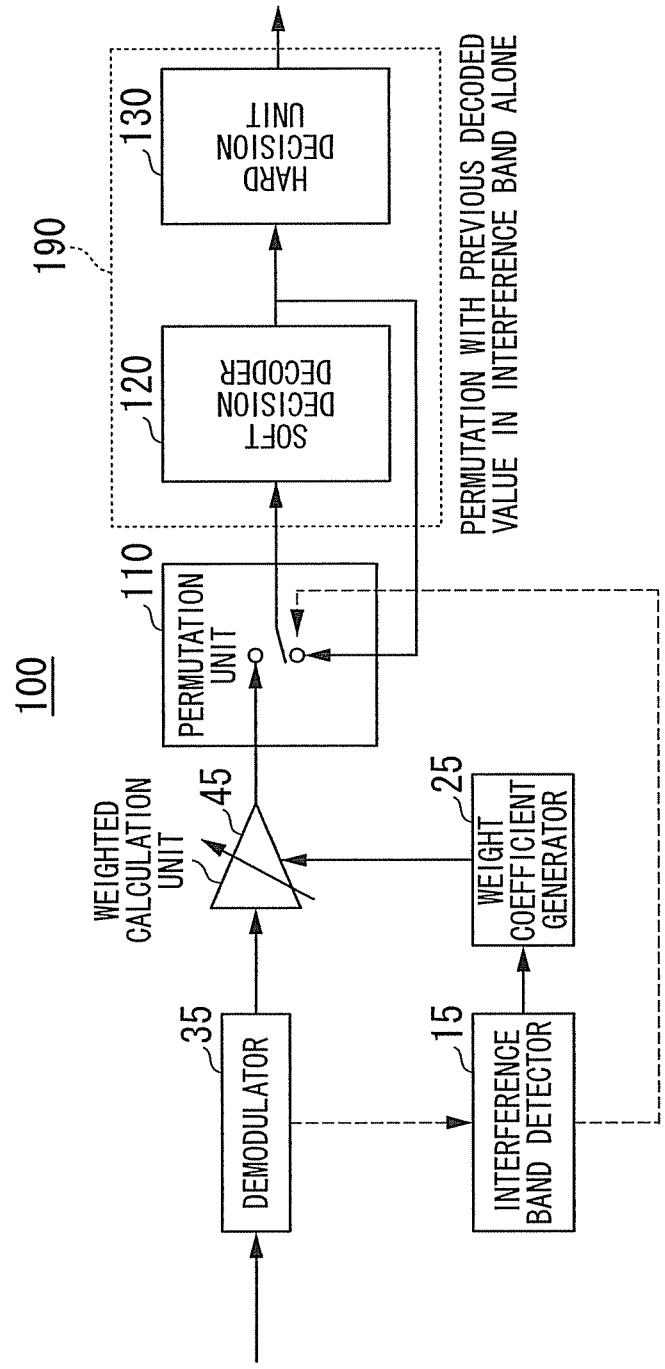
FIG. 10 A block diagram showing a reception device according to a fifth embodiment of the present invention.

FIG. 10 is a block diagram showing a reception device 100 according to the present embodiment.

The reception device 100 is constituted of an interference band detector 15, a weight coefficient generator 25, a demodulator 35, a weighted calculation unit 45, a permutation unit 110, a soft decision decoder 120, and a hard decision decoder 130, wherein signals of desired waves are extracted from reception signals consisting of desired waves and interference waves via forward error correction codes.

Next, the internal constitution of the reception device 100 will be described.

Upon establishment of a local station facilitating FWA (Fixed Wireless Access) using the reception device 100, the interference band detector 15 detects frequency bands causing interferences among available frequency bands of desired waves of the reception device 100 from wireless signals transmitted from the other system.

The interference band detector 15 transmits a suspension request for transmission of wireless signals via desired waves to the transmission-source wireless station of desired waves, for example, wherein it detects the existence/nonexistence and the signal intensity of other wireless signals of sub-carriers of available frequency bands of desired waves in an environment transmitting no desired waves, thus detecting sub-carriers causing interferences. The interference band detector 15 generates a string of specific sub-carrier decision values, i.e. a string of interference band decision values in which "1" is assigned to specific sub-carriers whilst "0" is assigned to sub-carriers other than specific sub-carriers, for example. The interference band detector 15 outputs the detection result to the weight coefficient generator 25.

The weight coefficient generator 25 calculates weight coefficients of sub-carriers adapted to specific sub-carrier decision values. The weight coefficients generated by the weight coefficient generator 25 are weight coefficients which decrease reliability with respect to sub-carriers, caused via interferences and detected by the interference band detector 15, compared to other sub-carriers. The weight coefficient generator 25 outputs a string of the calculated weight coefficients aligned via sub-carriers to the weighted calculation unit 45. The demodulator 35 converts received wireless signals including desired waves subjected to forward error correction coding into electric signals of sub-carriers, so that it outputs demodulated values of sub-carriers to the weighted calculation unit 45. The weighted calculation unit 45 performed weighted calculation on demodulated values output from the demodulator 35 via sub-carriers on the basis of weight coefficients from the weight coefficient generator 35, thus outputting a string of likelihood data aligning calculation results of sub-carriers.

The permutation unit 110 selects and outputs data of sub-carriers from among a string of likelihood data from the weighted calculation unit 45 and a string of soft decision decoding data (reproduction signals) output from the soft decision decoder 120. It selects data based on channel specifying signals specifying sub-carriers causing interferences detected by the interference band detector 15. That is, with respect to sub-carriers causing interferences, the output of the soft decision decoder 120 except for its first time is selected instead of a string of data generated based on reception signals.

Based on a string of data selected by the permutation unit 110, the soft decision decoder 120 performs error correction processes and decoding processes, thus capturing the soft decision decoding result of each sub-carrier. Unlike discrete values produced by the hard decision result, the soft decision decoding result indicates numerical values, i.e. intermediate values calculated by calculation processes. It is possible to select a decoding process adapted to a coding method of desired waves in the soft decision decoder 120.

Based on the soft decision decoding result produced by the soft decision decoder 120, the hard decision unit 130 performs a hard decision process based on a predetermined threshold so as to capture a signal of a desired wave.

A decoder 190 is formed by combining the soft decision decoder 120 and the hard decision unit 130.

Next, the operation of the reception device 100 according to the fifth embodiment of the present invention will be described with reference to the drawings.

Figure 11:
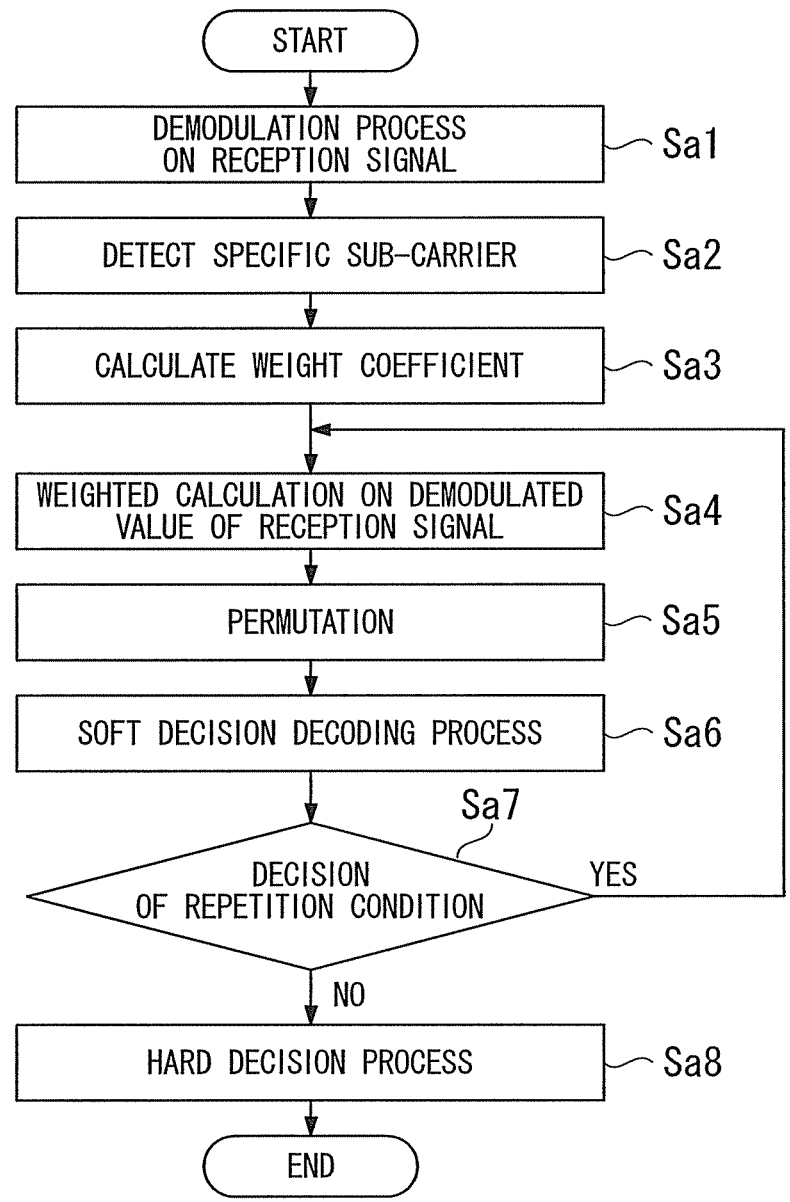
FIG. 11 A flowchart showing the operation of the reception device of the fifth embodiment.

FIG. 11 is a flowchart showing the operation of the reception device 100.

In the reception device 100, upon establishment of a local station with the reception device 100, the interference band detector 15 detects whether or not an interference band occurs at the timing having no desired wave and the frequency band of a sub-carrier having no desired wave. The interference band detector 15 detects an interference band in the frequency band corresponding to each sub-carrier of a desired wave in the demodulator 35. The items detected as the interference band information include the reception level of wireless signals of each sub-carrier, the frequency band, the center frequency, and the overlap band with each desired wave (step Sa1).

The interference wave information is captured based on the detection result. Based on the captured interference wave information, the interference band detector 15 selects (detects) sub-carriers having interference waves by way of specific sub-carriers. The interference band detector 15 detects sub-carriers of frequency bands receiving signals at the predetermined reception level or more, for example, based on reception levels by way of specific sub-carriers.

Figure 12:
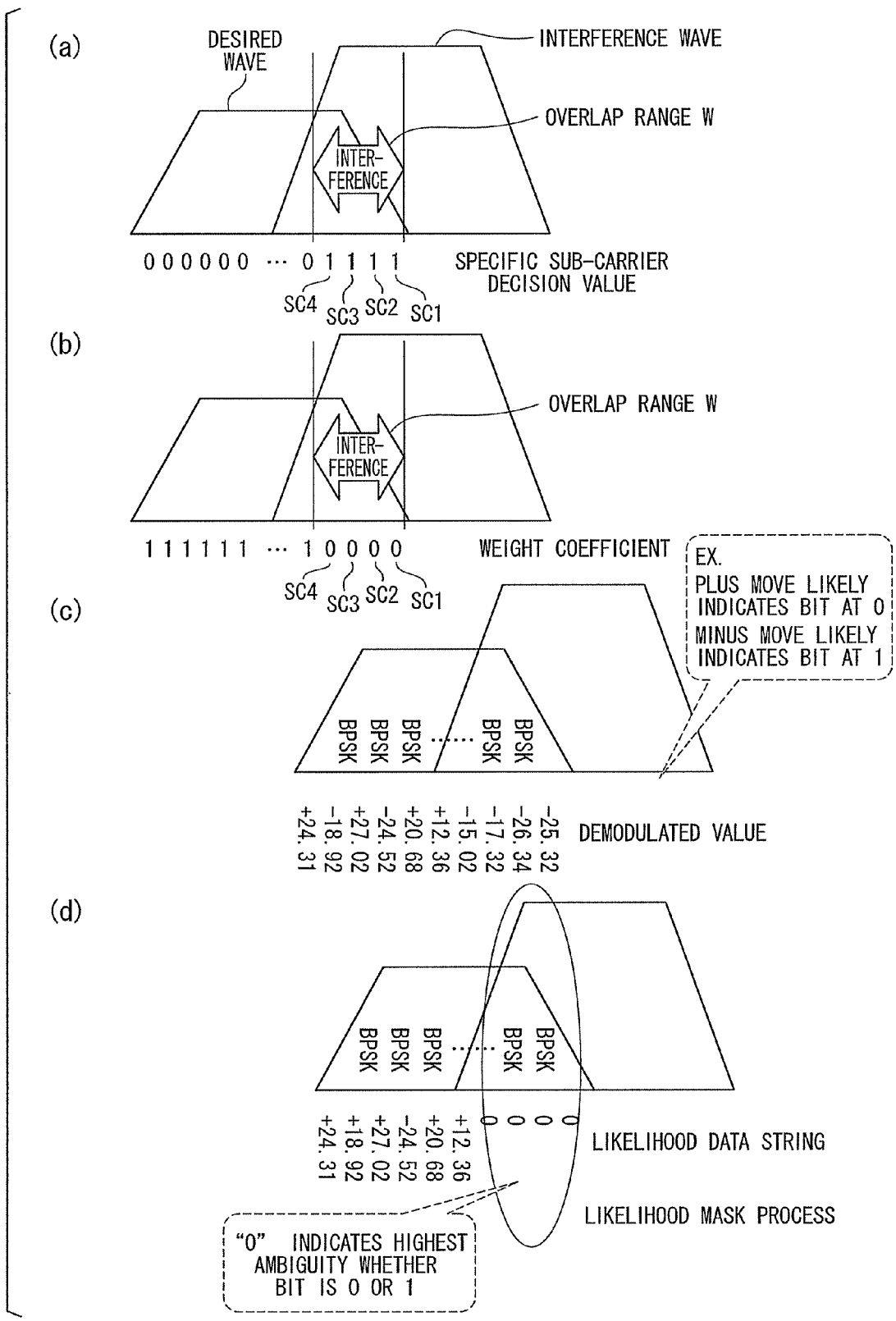
FIG. 12 Waveforms showing transitions of supply voltages at a power shutdown mode in the fifth embodiment.

FIG. 12 show conceptual illustrations representing the content of processing of the reception device 100. The interference band detector 15 detects sub-carriers SC1 through SC4 included in an overlap band W (or an interference band), in which a desired wave overlaps with an interference wave in FIG. 12(*a*), in connection with specific sub-carriers. The interference band detector 15 generates a string of specific sub-carrier decision values in which "1" is assigned to the sub-carriers SC1 through SC4 whilst "0" is assigned to other sub-carriers.

Referring back to FIG. 11, the interference band detector 15 outputs the generated string of specific sub-carrier decision values to the weight coefficient generator 25 (step Sa2).

Based on the specific sub-carrier decision values generated by the interference band detector 15, the weight coefficient generator 25 generates weight coefficients for reducing reliability in specific sub-carriers compared to other sub-carriers. These weight coefficients are weight coefficients that convert demodulated values into a predetermined value, e.g. "0", with respect to sub-carriers assigned with "1" within the string of specific sub-carrier decision values.

The weight coefficient generator 25 outputs the string of weight coefficients generated in sub-carriers to the weighted calculation unit 45 (step Sa3).

In the present embodiment, the processes of steps Sa1 through Sa3 are performed before the reception device 100 receives signals. Next, a reception process of wireless signals using desired waves will be described. The demodulator 35 demodulates wireless signals in frequency bands of desired waves of sub-carriers, thus outputting digital data consisting of demodulated values of sub-carriers to the weighted calculation unit 45.

Based on weight coefficients of sub-carriers and demodulated values of sub-carriers, the weighted calculation unit 45 performs weighted calculation adapted to a coding method of desired waves, thus outputting a string of calculation results, i.e. a string of likelihood data (step Sa4).

An example of the weighted calculation adapted to a coding method will be described with respect to a soft decision positive/negative multi-valued coding method of desired waves with reference to FIG. 12 (*b*) through FIG. 12(*d*). The soft decision positive/negative multi-valued coding method adopts a decoding process providing a positive/negative multi-valued output consisting of demodulated values of reception signals, wherein the decoding process is performed such that a negative value is determined as "+1" whilst a positive value is determined as "−1" with reference to an absolute value serving as a reliability (or a likelihood representing a probability of values).

FIG. 12(*b*) is an illustration showing weight coefficients of sub-carriers. FIG. 12(*c*) is an illustration showing a positive/negative multi-valued output consisting of demodulated values of sub-carriers. In this illustration, a sub-carrier having a highest positive value "+27.02" presents a highest reliability as "−1". A sub-carrier having a lowest negative value of "−26.34" presents a highest reliability as "+1".

A sub-carrier having a minimum absolute value, i.e. a demodulated value 0, presents a highest ambiguity (or a lowest reliability) as either "+1" or "−1".

Therefore, it is possible to reduce a reliability of demodulated values with respect to the sub-carriers SC1 through SC4 in step Sa3 of FIG. 11 in which the weighted calculation unit 45 performs weighted calculation to convert the demodulated values of the sub-carriers SC1 through SC4 into "0" based on the weight coefficients calculated by the weight coefficient generator 25. As shown in FIG. 12(*b*), the weight coefficient generator 25 generates a string of weight coefficients assigned with logical negation values for specific sub-carrier decision values shown in FIG. 12(*a*) in connection with sub-carriers.

As an example of the weighted calculation performed by the weighted calculation unit 45, the weighted calculation unit 45 multiplies demodulated values of FIG. 12(*c*) by weight coefficients of FIG. 12(*b*), i.e. logical negation values for specific sub-carrier decision values. Specifically, the weighted calculation unit 45 multiplies a demodulated value "−25.32" by a weight coefficient "0" by way of the specific sub-carrier SC1, thus outputting a multiplication result "0", i.e. a weighted-calculation-implemented demodulated value. Similarly, it multiplies demodulated values by a weight coefficient "1" by way of sub-carriers other than specific sub-carriers, thus outputting a string consisting of multiplication results produced for all the sub-carriers, i.e. a string of likelihood data, to the following decoder 190.

FIG. 12(*d*) is an illustration representing a string of likelihood data which is produced via weighted calculation on weight coefficients and positive/negative multi-valued demodulated values of sub-carriers by the weighted calculation unit 45. As shown in this illustration, weighted-calculation-implemented likelihood data regarding the specific sub-carriers SC1 through SC4 have a lowest reliability as "0"; hence, other demodulated values are not changed.

Referring back to FIG. 11, the permutation unit 110 inputs a string of likelihood data from the weighted calculation unit 45 and a string of soft decision decoding data (i.e. reproduction signals) from the soft decision decoder 120 so as to select data and output a string of data in frequency bands causing interferences detected by the interference band detector 15 (step Sa5).

The soft decision decoder 120 performs a soft decision decoding process based on a string of data output from the permutation unit 110. That is, it performs a forward error correction process and a decoding process on a string of data input thereto, thus outputting the soft decision decoding result (step Sa6).

A decision is made as to whether or not a current time reaches a predetermined number of repetition times. When the decision result indicates that the current time does not reach the predetermined number of repetition times, the processes starting from step Sa4 are repeated (step Sa7).

When a decision result of step Sa1 indicates that the current time reaches the predetermined number of repetition times, the hard decision unit 130 performs a decision process based on the soft decision decoding result, thus completing the reception process (step Sa8).

According to the present embodiment, the soft decision decoder 120 performs soft decision decoding implementing forward error correction decoding on sub-carriers input thereto; and subsequently, a hard decision process is performed to define the decoding result based on the soft decision decoding result. The permutation unit 110 changes sub-carriers subjected to weighted calculation based on reception signals with sub-carriers based on the soft decision decoding result, i.e. reproduction signals.

Thus, the soft decision decoder 120 indicates the soft decision decoding result with consecutive values, allowing the permutation unit 110 to permutate sub-carriers of wireless signals received via those values. Based on the soft decision decoding result, the permutation unit 110 permutates reception signals susceptible to interference waves, thus reducing the influence of interference waves.

Similar to sub-carriers based on reception signals, sub-carriers which the permutation unit 110 permutates based on the soft decision decoding result may be subjected to weighted calculation using the predetermined weight coefficient. The weight coefficient can be generated by a weight coefficient generator commensurate with the weight coefficient generator 25. Alternatively, it can be generated by a single weight coefficient generator.

Thus, it is possible to facilitate permutation between sub-carriers based on reception signals and sub-carriers based on the soft decision decoding result.

Sixth Embodiment

Hereinafter, a reception device according to one embodiment of the present invention will be described with reference to the drawings.

Figure 13:
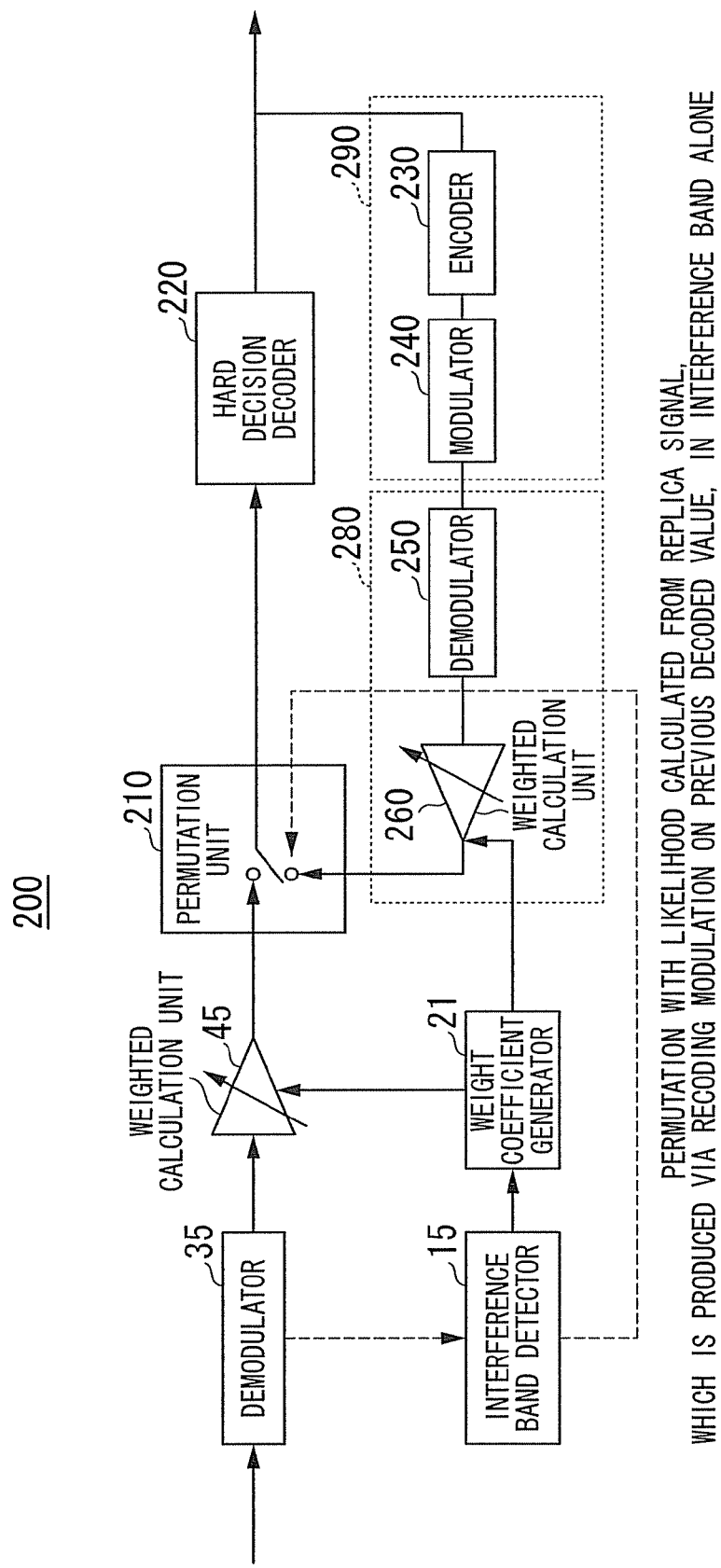
FIG. 13 A block diagram showing a reception device according to a sixth embodiment.

FIG. 13 is a block diagram showing the outline of the reception device 200 of the present embodiment.

The reception device 200 is constituted of an interference band detector 15, a weight coefficient generator 21, a decoder 35, a weighted calculation unit 45, a permutation unit 210, a hard decision decoder 220, an encoder 230, a modulator 240, a demodulator 250, and a weighted calculation unit 260, wherein signals of desired waves are extracted from reception signals consisting of desired waves and interference waves via forward error correction codes. The same constitution as the constitution shown in FIG. 10 is designated by the same reference numeral; hence, a distinct constitution will be described.

Next, the internal constitution of the reception device 200 will be described.

The interference band detector 15 outputs the detection result to the weight coefficient generator 21.

The weight coefficient generator 21 calculates weight coefficients of sub-carriers in connection with specific sub-carrier decision values. The weight coefficients calculated by the weight coefficient generator 21 are weight coefficients that reduce reliability with respect to sub-carriers causing interferences detected by the interference band detector 15 rather than other sub-carriers. The weight coefficient generator 21 outputs a string of the calculated weight coefficients aligned in sub-carriers to the weighted calculation unit 45. In addition, the weight coefficient generator 21 inverts the weight coefficients supplied to the weighed calculation unit 45 so as to generate and output weight coefficients, which reduces reliability with respect to sub-carriers causing no interference rather than other sub-carriers, to the weighted calculation unit 260.

Based on weight coefficients from the weight coefficient generator 21, the weighted calculation unit 45 performs weighted calculation on demodulated values from the demodulator 35 in sub-carriers, thus outputting a string of calculation results aligned in sub-carriers by way of a string of likelihood data.

The permutation unit 210 selects and outputs data of sub-carriers among a string of likelihood data from the weighted calculation unit 45 and a string of dummy data (i.e. reproduction signals) from the weighted calculation unit 260. It selects data based on channel specifying signals specifying sub-carriers causing interference detected by the interference band detector 15. With respect to sub-carriers causing interference, a string of dummy data produced based on decoded data of the hard decision decoder 220 is selected instead of a string of data produced based on reception signals.

The hard decision decoder 220 performs a forward error correction process and a decoding process based on a string of data selected by the permutation unit 110, thus capturing hard decision decoding results of sub-carriers. As the decoding process of the hard decision decoder 220, it is possible to select a decoding process adapted to a coding method of desired waves.

The encoder 230 performs a coding process in correspondence with a coding method of desired waves. It is commensurate with a coding process of the counterpart transmission device connected with the reception device 200. The modulator 240 modulates coding data of the encoder 230 in accordance with the same modulation method applied to reception signals.

A dummy transmission unit 290 includes the encoder 230 and the modulator 240.

The demodulator 250 is commensurate with the demodulator 35, wherein it demodulates modulation signals from the modulator 240. The weighted calculation unit 260 is commensurate with the weighted calculation unit 45, whereby they differ in terms of weight coefficients from the weight coefficient generator 21. Weight coefficients are determined such that lower weight coefficients are set to frequency bands implementing higher weights for reception signals.

A dummy reception unit 280 is configured of the demodulator 250 and the weighted calculation unit 260. That is, decoding data of the hard decision decoder 220 is subjected to transmission/reception via the dummy transmission unit 290 and the dummy reception unit 280, so that transmitted/received data (i.e. dummy sub-carriers) is output from the dummy reception unit 290. No interference occurs in a transmission path configured of the dummy transmission unit 290 and the dummy reception unit 280, which yields the transmission result via an ideal transmission path.

Next, the operation of the reception device 200 according to the sixth embodiment of the present invention will be described with reference to the drawings.

Figure 14:
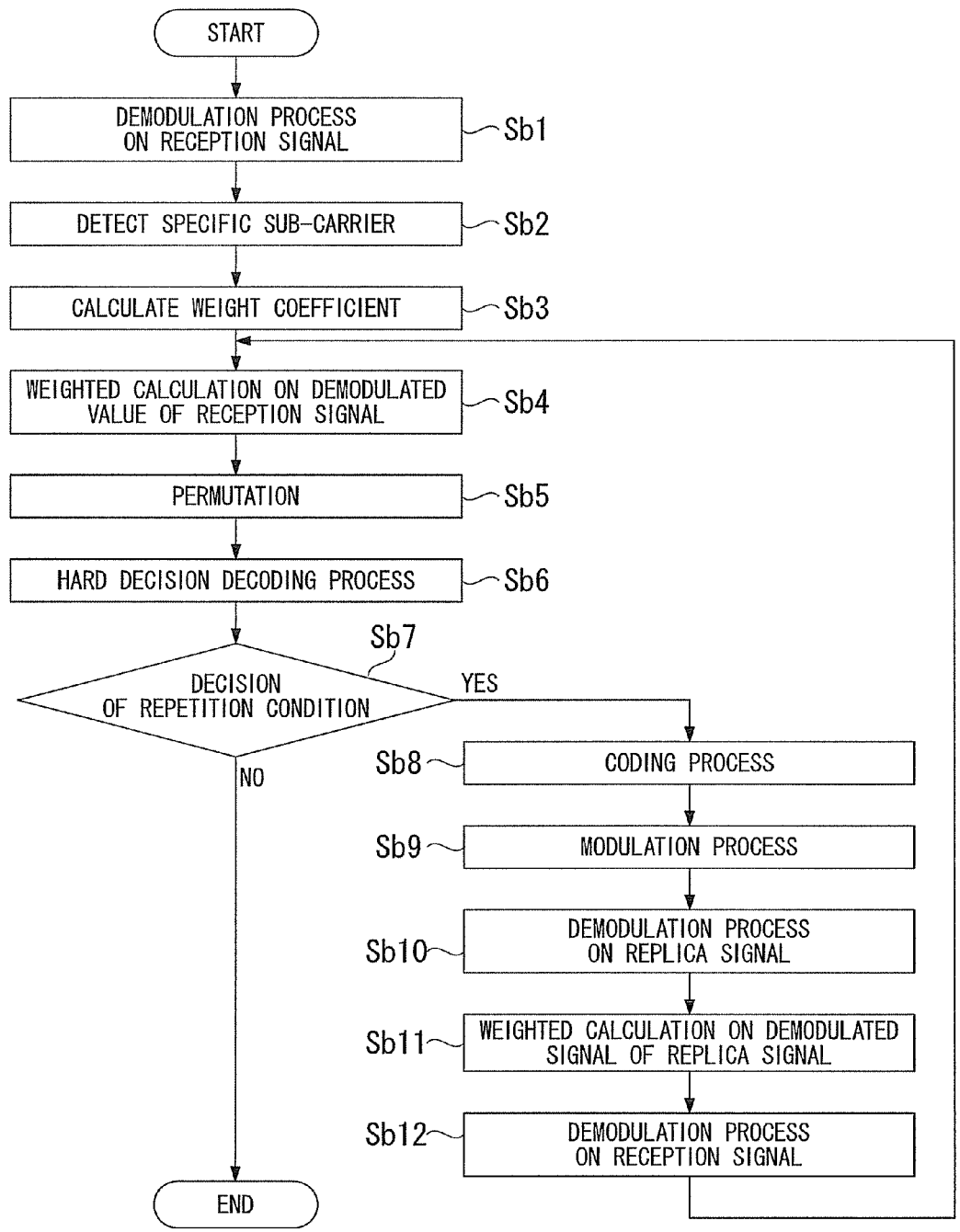
FIG. 14 A flowchart showing the operation of the reception device of the sixth embodiment.

FIG. 14 is a flowchart showing the operation of the reception device 200.

In the flowchart shown in this illustration, the same explanation as the processing of FIG. 11 will be made with reference to the counterpart processes shown in FIG. 11.

In the present embodiment, the processes of steps Sb1 through Sb3 are performed before the reception device 200 receives signals. They are commensurate with the processes of steps Sa1 through Sa3 in the reception device 100 shown in FIG. 11. In this connection, the weight coefficient generator 25 is replaced with the weight coefficient generator 21. In step Sb3, the weight coefficient generator 21 generates weight coefficients of sub-carriers, which are output to the weighted calculation unit 260, in addition to the process of step Sa3 conducted by the weight coefficient generator 25.

Next, the reception process of wireless signals using desired waves will be described. The demodulator 35 demodulates wireless signals having frequency bands of desired waves of sub-carriers, so that it outputs digital data representative of demodulated values of sub-carriers to the weighted calculation unit 45.

Based on weight coefficients of sub-carriers and demodulated values of sub-carriers, the weighted calculation unit 45 performs weighted calculation adapted to a coding method of a desired wave, thus outputting a string of calculation results by way of a string of likelihood data (step Sb4).

The hard decision decoder 220 selects data and outputs a string of data from among a string of soft decision decoding data (or reproduction signals) in units of frequency bands causing interference detected by the interference band detector 15 (step Sb5).

The hard decision decoder 220 performs soft decision decoding based on a string of data from the permutation unit 210. That is, it performs a forward error correction process and a decoding process on a string of data input thereto, thus outputting hard decision results (step Sb6).

A decision is made as to whether or not the current time reaches the predetermined number of repetition times. When the decision result indicates that the current time reaches the predetermined number of repetition times, the obtained hard decision result is presented as the decoding result, thus completing the reception process. When the decision result indicates that the current time does not reach the predetermined number of repetition times, the aforementioned processing is performed; and thereafter, the processes are repeated from step Sb4 (step Sb7).

Based on the hard decision result, the encoder 230 encodes the output signal of the hard decision decoder 230, thus outputting encoded data to the modulator 240 (step Sb8).

The modulator 240 modulates encoded data of the encoder 230 in accordance with the same modulation method as the reception signal. The modulated signal serves as an ideal replica signal of the reception signal (step Sb9).

The demodulator 250 demodulates the modulated signal of the modulator 240 serving as the replica signal input thereto (step Sb10).

The weighted calculation unit 260 performs weighted calculation on the demodulated value of the replica signal demodulated by the demodulator 250 (step Sb11).

The demodulator 35 performs a demodulating process on the input reception signal; subsequently, the processes are continuously performed from step Sb4 (step Sb12).

Figure 15:
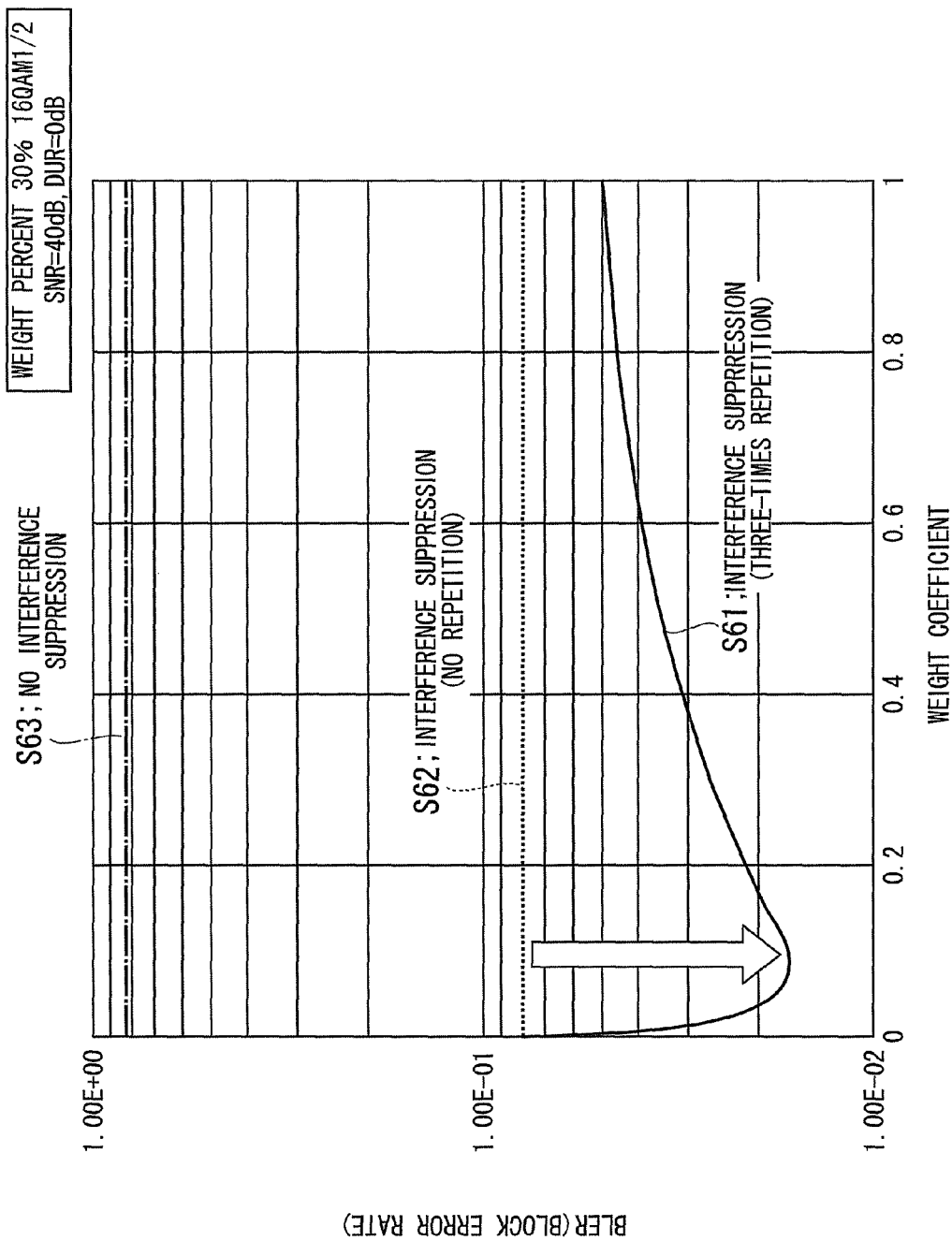
FIG. 15 A graph showing characteristics of the reception device of the sixth embodiment.

FIG. 15 is a graph showing the characteristics of the reception device of the sixth embodiment.

This illustration shows the BLER (Block Error Rate) characteristic with respect to the setting of weight coefficients. This characteristic is obtained based on the following condition. That is, a coding method is a hexadecimal QAM (Quadrature Amplitude Modulation); a coding rate is ½; a weight factor is 30%; an SNR (Signal to Noise Ratio) is 40 dB (decibel); a DUR (Desired to Undesired signal power Ratio) is 0 dB (decibel).

In this graph, the horizontal axis represents the weight coefficient whilst the vertical axis represents BLER (Block Error Rate).

A graph S61 shows the characteristic according to an interference suppression method of the present embodiment. The number of repetition times is set to three. For the sake of comparison between characteristics, graphs S62, S63 are united together. The graph S62 shows the characteristic according to the interference suppression method of Non-Patent Document 2, which is equivalent to the present embodiment, however, if the number of repetition times is set to one. The graph S63 shows the characteristic which is measured without adopting the interference suppression method.

Comparison between illustrated graphs, the characteristic of the present embodiment illustrated in the graph S61 indicates a minimum value ($1.6 \times 10^{-2}$) of BLER in proximity to the weight coefficient of 0.1, which is markedly improved compared to BLER (approximately $8 \times 10^{-2}$) of the graph S62 and BLER (approximately $8.2 \times 10^{-1}$) of the graph S63.

According to the present embodiment, dummy transmission signals are reproduced based on signals output from the hard decision decoder 220, so that dummy sub-carriers are generated based on dummy transmission signals. The permutation unit 210 permutates sub-carriers, which are subjected to weighted calculation based on reception signals, on the basis of dummy sub-carriers corresponding to reproduction signals.

Thus, the dummy transmission unit 290 performs a dummy modulation process while the dummy reception unit 280 performs a dummy demodulation process on the basis of the hard decision decoding result of the hard decision decoder 220. This makes it possible to obtain reception signals assuming variations of signals undergoing ideal transmission; hence, the permutation unit 210 is able to permutate sub-carriers in received wireless signals by use of those values. Based on the soft decision decoding result, the permutation unit 210 permutates reception signals in frequency bands susceptible to interference waves, thus reducing the influence of interference waves.

Dummy sub-carriers need to be subjected to weight calculation based on weight coefficients.

Since the permutation unit 210 performs weighting on dummy sub-carriers, substituted for sub-carriers of reception signals, by use of weight coefficients, it is possible to secure a balance with permutated reception signals. Thus, it is possible to improve reproducibility of permutated signals and to thereby reduce the influence of interference waves.

Seventh Embodiment

Hereinafter, a reception device according to one embodiment of the present invention will be described with reference to the drawings.

Figure 16:
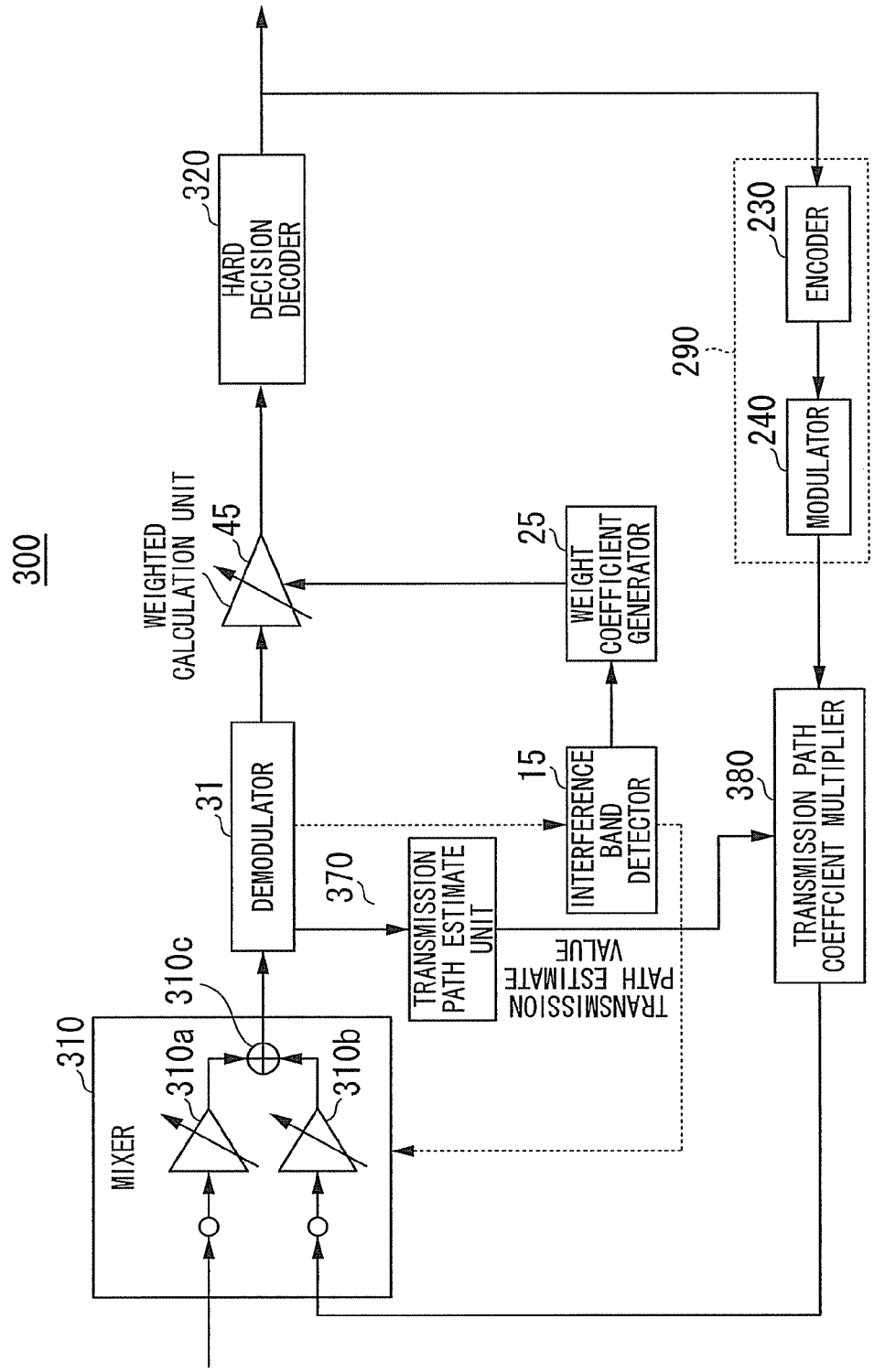
FIG. 16 A block diagram showing a reception device according to a seventh embodiment.

FIG. 16 is a block diagram showing the outline of a reception device 300 of the present embodiment.

The reception device 300 is constituted of an interference band detector 15, a weight coefficient generator 25, a demodulator 31, a weighted calculation unit 45, a mixer (or a permutation unit) 310, a hard decision decoder 320, an encoder 230, a modulator 240, a transmission path estimate unit 370 and a transmission path coefficient multiplier 380, wherein signals of desired waves are extracted from reception signals consisting of desired waves and interference waves via forward error correction codes. Herein, the same constitution as the constitution shown in FIG. 10 and FIG. 13 is designated by the same reference numeral; hence, a distinct constitution will be described.

Next, the internal constitution of the reception device 300 will be described.

The demodulator 31 converts received wireless signals including desired waves subjected to forward error correction coding into electric signals of sub-carriers, thus outputting demodulated values of sub-carriers to the weight calculation unit 45 and the transmission path estimate unit 370.

Based on weight coefficients from the weight coefficient generator 21, the weighted calculation unit 45 performs weighted calculation on demodulated values of the demodulator 31, thus outputting a string of calculation results aligned in sub-carriers by way of a string of likelihood data.

The mixer (or the permutation unit) 310 is constituted of weighted operators 310a, 310b and an adder 310c. The weighted operator 310a (or 310b) is set up based on a channel specifying signal specifying a sub-carrier causing interference detected by the interference band detector 15. That is, the mixer 310 inputs reception signals and dummy retransmission signals of the transmission path coefficient multiplier 380, thus outputting mixed signals mixing respective signals multiplied by weight coefficients.

The mixer 310 is able to select any one of the following mixing methods. As selectable mixing methods, it is possible to list a maximum ratio mixing method, a common-mode mixing method and a selective mixing method. The maximum ratio mixing method is a mixing method in which a plurality of signals is mixed together by use of weight coefficients proportional to SNR. The selective mixing method is a mixing method in which input signals are each selectively output by setting their weight coefficients to "1" or "0".

The hard decision decoder 320 performs a forward error correction process and a decoding process on a string of likelihood data from the weighted calculation unit 45, thus obtaining the hard decision decoding result of each sub-carrier. As the decoding process of the hard decision decoder 320, it is possible to select a decoding process adapted to a coding method of desired waves.

The transmission path estimate unit 370 estimates the transmission path characteristics based on the detection result of the demodulator 31, thus outputting transmission path estimate values to the transmission path coefficient multiplier 380.

The transmission path coefficient multiplier 380 multiplies modulation signals of the modulator 240 by transmission path estimate values of the transmission path estimate unit 370, thus outputting dummy retransmission signals. It is possible to calculate signals equivalent to input reception signals by multiplying dummy transmission signals output via the dummy transmission unit 290 by transmission path estimate values based on decoded signals of the hard decision decoder 320. That is, the transmission path coefficient multiplier 380 outputs decoded data of the hard decision decoder 320 which is turned into modulated signals while being transmitted through the dummy transmission unit 290. The transmission path coefficient multiplier 380 forms a transmission path which does not cause interference so as to produce the same transmission result as the ideal transmission path.

Next, the operation of the reception device 300 according to the seventh embodiment of the present invention will be described with reference to the drawings.

Figure 17:
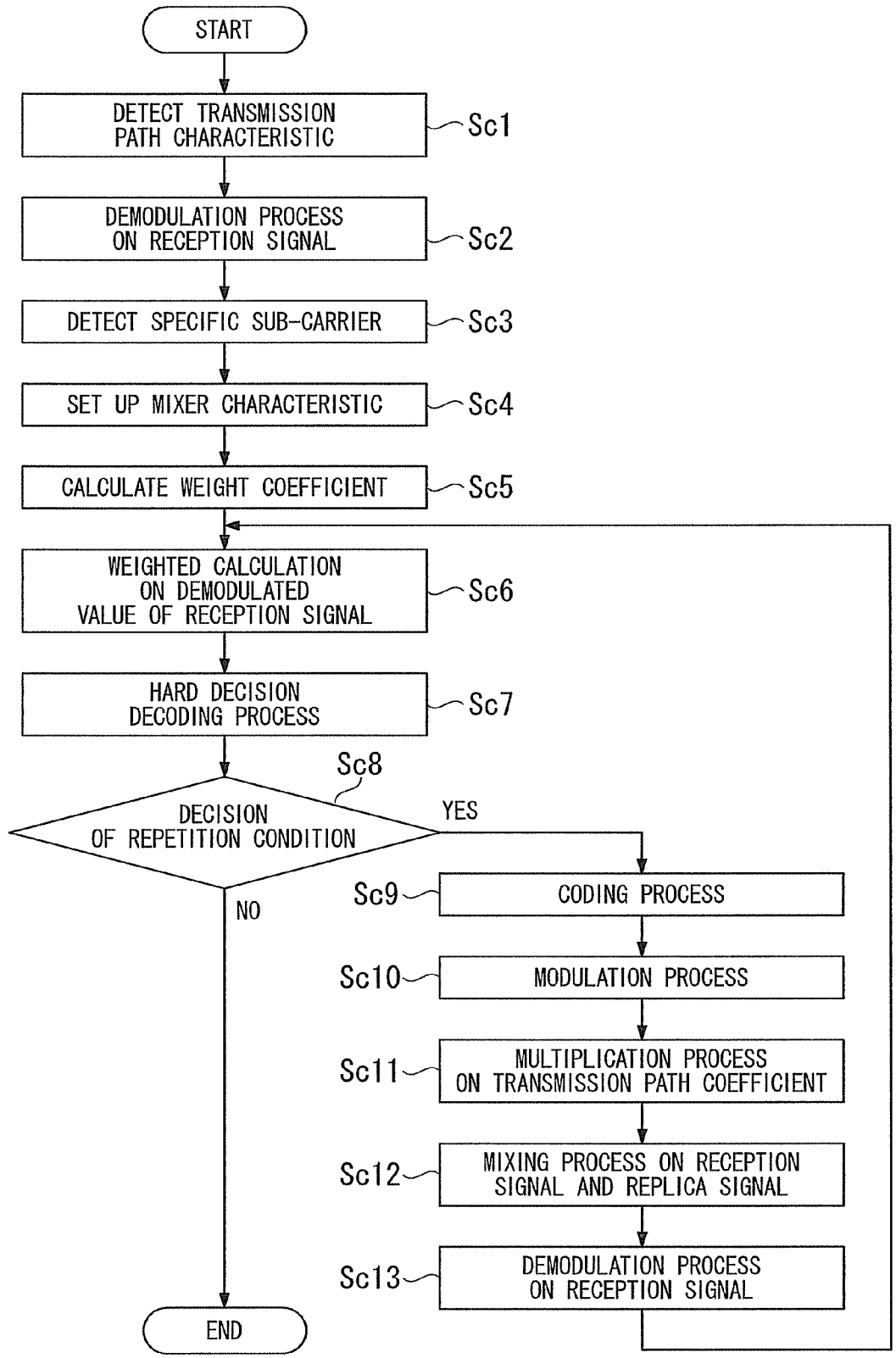
FIG. 17 A flowchart showing the operation of the reception device of the seventh embodiment.

FIG. 17 is a flowchart showing the operation of the reception device 300.

In the illustrated flowchart, the same explanation as the processing of FIG. 11 is made with reference to the counterpart process shown in FIG. 11.

In the present embodiment, the processes of step Sc1 through Sc5 are performed before the reception device 300 receives signals. Distinctive points will be described with reference to the processes step Sa1 through Sa3 in the reception device 100 shown in FIG. 11.

The transmission path estimate unit 370 detects transmission path characteristics so as to calculate transmission path estimate values based on detected signals of the demodulator 31. The transmission path estimate unit 370 sets the calculated transmission path estimate values to the transmission path coefficient multiplier 380 (step Sc1).

The demodulator 31 performs a demodulation process on reception signals. The demodulation process of reception signals is commensurate with the foregoing step Sa1, wherein the demodulator 35 is replaced with the demodulator 31 (step Sc2).

The interference band detector 15 detects specific sub-carriers susceptible to interference waves from reception signals of the demodulator 31. The process for detecting specific sub-carriers is commensurate with the foregoing step Sa2 (step Sc3).

The interference band detector 15 sets weight coefficients dictating the characteristics of the mixer 310.

In a first decoding process in the mixer 310, reception signals are prioritized and directly output without using the aforementioned weight coefficients.

Figure 18:
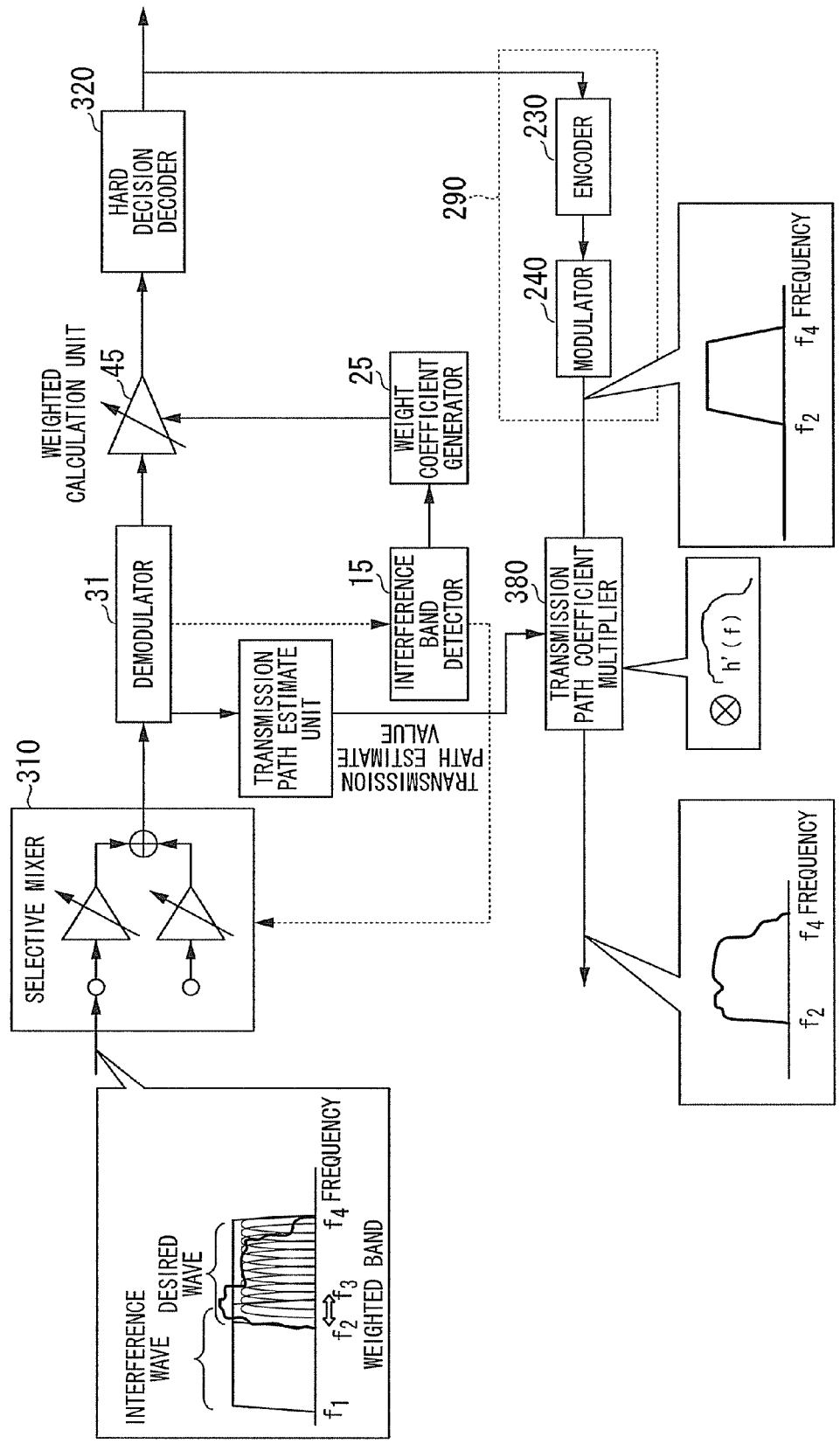
FIG. 18 An illustration (part 1) showing the operation of the reception device of the seventh embodiment.

FIG. 18 shows a flow of signals in the first decoding process. This illustration shows that the mixer 310 inputs a reception signal convoluted with an interference wave (in a frequency band defined between f2 and f3). The mixer 310 outputs the reception signal. This process of the mixer 310 illustrates the selective mixing process.

In a second decoding process onwards, the mixer 310 mixes newly received wireless signals with replica signals created based on previously received signals, thus producing signals which are reduced in interference components in an interference band. Mixed signals are output to the demodulator 31.

Figure 19:
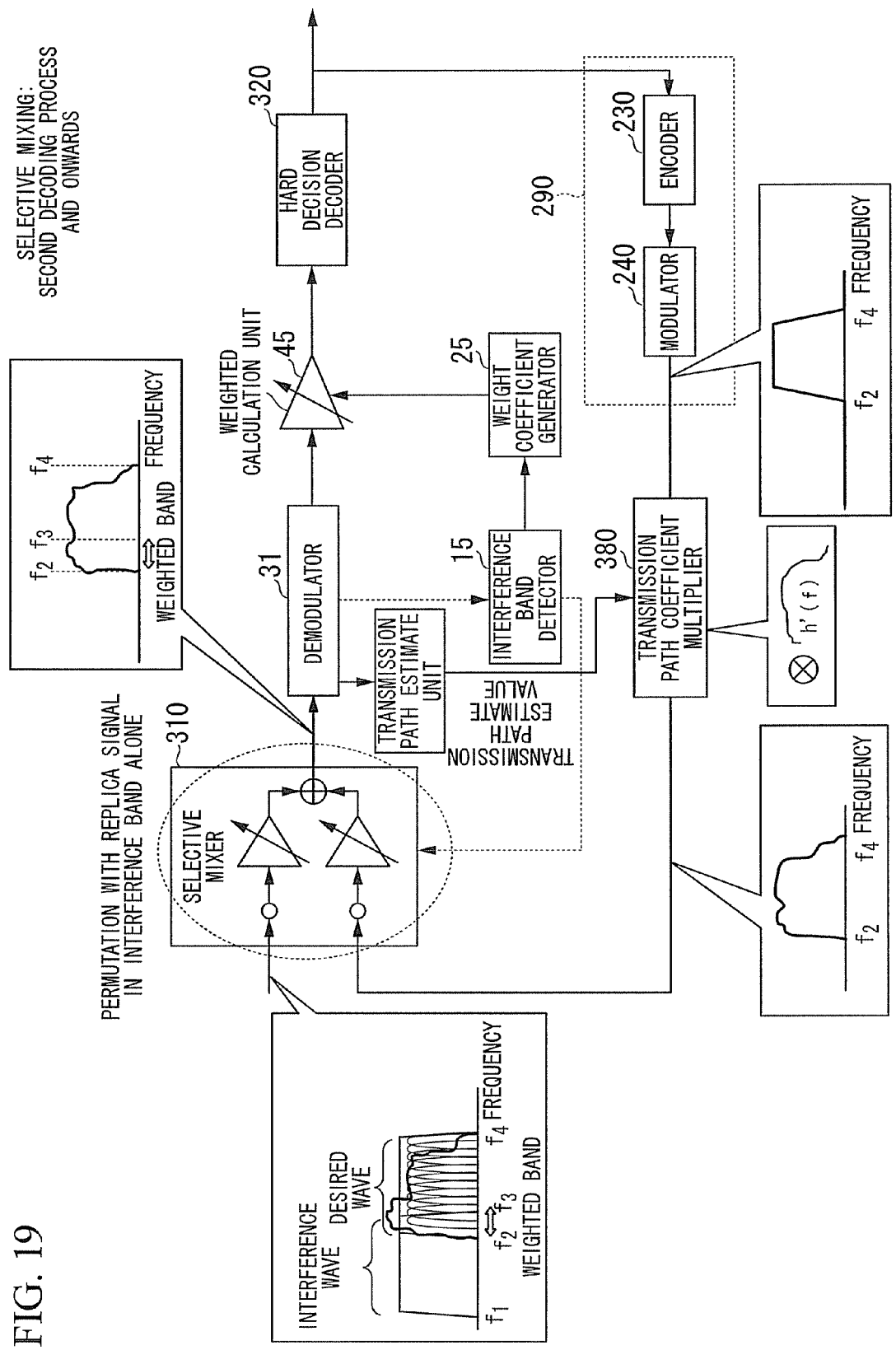
FIG. 19 An illustration (part 2) showing the operation of the reception device of the seventh embodiment.
Figure 20:
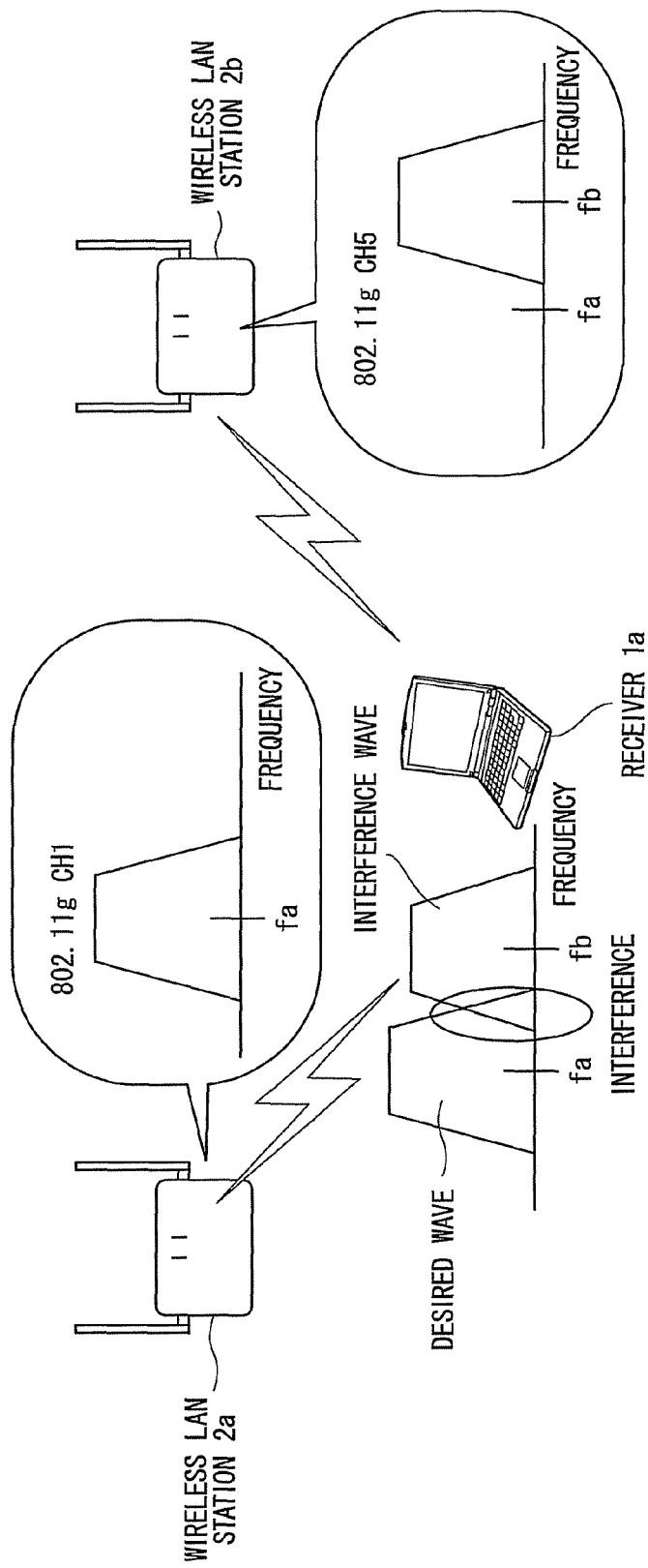
FIG. 20 A conceptual illustration showing the overall constitution including two wireless LAN systems having different frequency channels.
Figure 21:
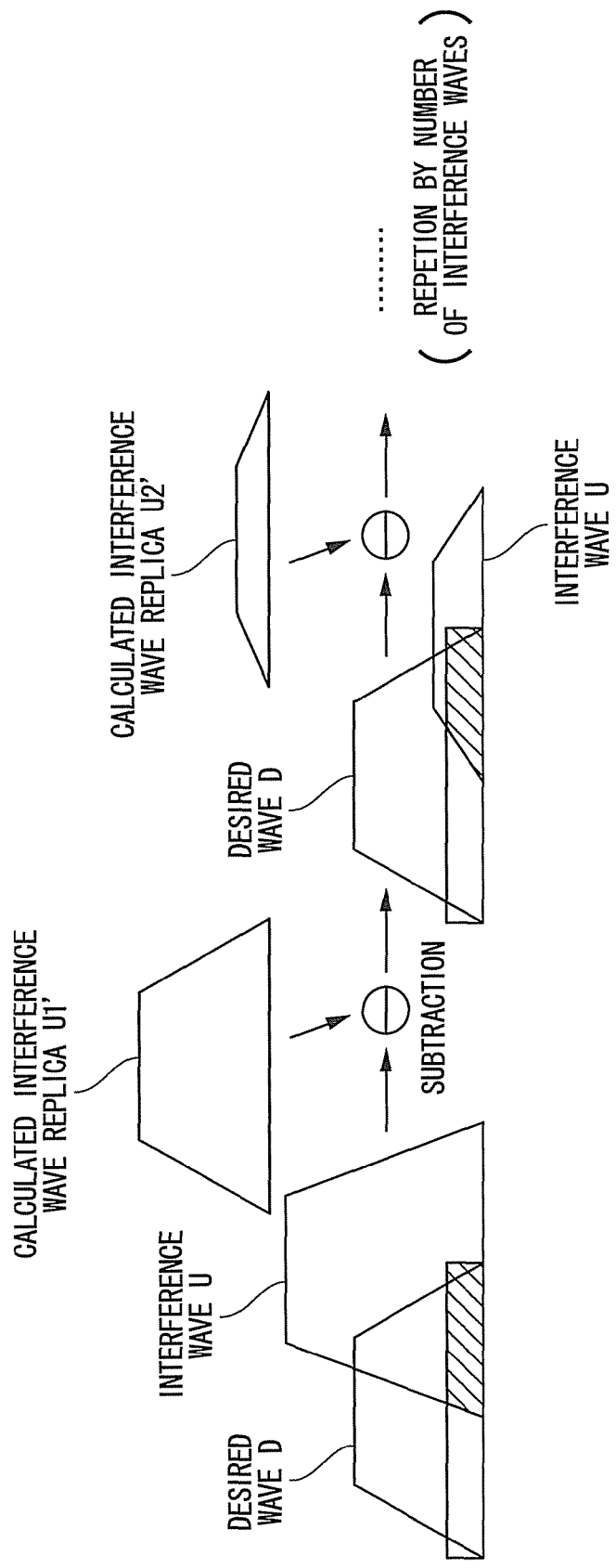
FIG. 21 An illustration showing the outline of processing for subtracting interference wave replicas for interference waves.

FIG. 19 shows a flow of signals in a second decoding process onwards. This illustration shows that the mixer 310 inputs a reception signal convoluted with an interference wave (in a frequency band defied between f2 and f3). The reception signal is mixed with a replica signal (i.e. an output signal of the transmission path coefficient multiplier 380) created by the preceding decoding process, wherein the replica signal is prioritized and mixed with a signal of an interference band between f2 and f3. The illustrated mixing result indicates that, owing to the selective mixing in the interference band, a signal which is reduced in interference components involved in the reception signal is input to the demodulator 31 (step Sc4).

Referring back to FIG. 17, processes will be sequentially described.

The weight coefficient generator 25 generates and outputs a string of weight coefficients of sub-carriers to the weighted calculation unit 45. The detection process is commensurate with the foregoing step Sa2 (step Sc5).

Next, the reception process of wireless signals using desired waves will be described.

The demodulator 31 demodulates mixed signals of the mixer 310 in sub-carriers of wireless signals having frequency bands of desired waves, thus outputting digital data consisting of demodulated values of sub-carriers to the weighted calculation unit 45.

Based on weight coefficients of sub-carriers and demodulated values of sub-carriers, the weighted calculation unit 45 performs weighted calculation according to a calculation method adapted to a coding method of desired waves, thus outputting a string of calculation results by way of a string of likelihood data (step Sc6).

Data are selected from among a string of hard decision decoding data (i.e. reproduction signals) output from the hard decision decoder 320 in units of frequency bands causing interference detected by the interference band detector 15, so that a string of selected data is output (step Sc7).

A decision is made as to whether or not the current time reaches the predetermined number of repetition times. When the decision result indicates that the current time reaches the predetermined number of repetition times, the obtained hard decision result is output as the decoding result, thus completing the reception process. When the decision result indicates that the current time does not reach the predetermined number of repetition times, the following processes are performed; thereafter, the processes are repeated from step Sb4 (step Sc8).

Based on the hard decision result, the encoder 230 encodes output signals of the hard decision decoder 320 so as to output encoded data to the modulator 240 (step Sc9).

The modulator 240 modulates encoded data of the encoder 230 in accordance with the same modulation method as the reception signal. The modulated signal serves as an ideal replica signal of the reception signal (step Sc10).

The transmission path coefficient multiplier 380 demodulates the modulation signal from the modulator 240 (step Sc11).

The mixer 310 performs a mixing process on the input wireless signal and the replica signal based on the preset characteristics, thus outputting a mixed signal (step Sb12).

The modulator 31 demodulates the input reception signal; subsequently, processes are continuously performed from step Sc6 (step Sc13).

The present embodiment produces a dummy transmission signal based on the output signal of the hard decision decoder 320, wherein the transmission path coefficient multiplier 380 multiplies the dummy transmission signal by the transmission path estimate value calculated by the transmission path estimate unit 370, thus producing the dummy retransmission signal. The mixer 310 permutates the reception signal based on the dummy retransmission signal serving as the reproduction signal.

This makes it possible to estimate a propagation distortion of the reception signal by use of the transmission path estimate value, wherein it is possible to reproduce a permutated dummy retransmission signal with a high fidelity. Thus, it is possible to improve the reproducibility of signals during permutation; hence, it is possible to reduce the influence of interference waves.

The mixing 310 performs calculation by use of weight coefficients which are set to the reception signal and the dummy retransmission signal respectively, thus performing a mixing process based on the calculation result.

Thus, it is possible to generate a mixed signal by use of the information of the reception signal and the information of the dummy retransmission signal. By selecting either one of them, it is possible to generate a mixed signal without failing the information; hence, it is possible to improve reproducibility of signals while being mixed and to thereby reduce the influence of interference waves.

In the mixing process of the mixer 310, input signals are mixed in accordance with the maximum ratio mixing method, the common-mode mixing method and selective mixing method as well as an arbitrary mixing method.

This makes it possible for the permutation process to reduce the effect of interference waves in an interference band by way of the mixing process, which can be selected from among a plurality of mixing processes.

The reception devices 100, 200 and 300 according to the foregoing embodiments adopting forward error correction codes can be applied to the multicarrier wireless communication system receiving and transmitting wireless signals composed of multiple sub-carriers. The interference band detector 15 detects an interference band, i.e. the frequency band of each sub-carrier susceptible to an interference wave, from among a plurality of received sub-carriers. The weighted calculation unit 45 performs weighted calculation on demodulated values of sub-carriers by use of weight coefficients which reduce reliability with respect to the interference band rather than frequency bands of sub-carriers insusceptible to interference waves. The soft decision decoder 120 and the hard decision decoder 220, 320 perform decoding processes for error corrections on sub-carriers of wireless signals including frequency bands in which signal components of the interference band are permutated. Based on the forward error correction decoding result, reproduction signals are produced via the permutation process which is repeatedly performed on the interference band. The soft decision decoder 120 and the hard decision decoder 220, 320 output the result of the repeatedly performed forward error correction decoding.

In short, in a first decoding process, a weighted calculation is performed on demodulated values of sub-carriers by use of weight coefficients which reduce reliability in the interference band rather than frequency bands of sub-carriers insusceptible to interference waves. In a second decoding process and onwards, a weighted calculation is performed on reproduction signals composed of likelihoods, dummy sub-carriers, or dummy transmission signals which are produced based on the forward error correction decoding result of the preceding decoding process, whereby likelihoods are calculated with respect to sub-carriers in the interference band which are produced based on weighted-calculation-implemented reproduction signals, so that decoding is performed while performing permutation on the input of a decoder in the first decoding process, i.e. the weighted-calculation-implemented output of a demodulator. Thereafter, the forward error correction process and the permutation process are repeated the predetermined number of times, thus outputting the decoding result.

In the multicarrier communication method adopting forward error correction codes, sub-carrier signals including interference waves embraced in reception signals of desired waves are replaced with reproduction signals formed based on reception signals. Thus, it is possible to demodulate multicarrier signals consisting of reception signals not including interference waves and replaced reproduction signals.

The permutation process is able to reduce an influence of interference waves; hence, it is possible to reduce a reception error rate irrespective of the power rate (D/U) between desired waves and interference waves, the type of forward error correction codes and the decoding method.

The permutation unit 110, 210 and the mixer 310 permutate weight coefficients.

This makes it possible to perform the permutation process by way of weighted calculation; hence, it is possible to reduce the amount of the permutation process.

In addition, the soft decision decoder 120 and the hard decision decoder 220, 320 repeat a decoding process on a single reception signal the predetermined number of times, whilst the permutation unit 110, 210 and the mixer 310 repeat a permutation process on a single reception signal the predetermined number of times.

Thus, it is possible to reduce the influence of interference waves by way of the decoding process and the permutation process which are repeatedly performed.

The above operation can be achieved even when either a hard decision decoder or a soft decision decoder is selected as a decoder used in the decoding process.

In the case of a reception device adopting a hard decision decoder (i.e. the hard decision decoder 220, 230), a dummy transmission signal (a replica) is reproduced based on the output signal of the decoding process.

In the permutation unit 210 and the mixer 310, the permutation process is performed using weighted-calculation-completed dummy transmission signals in the interference band of the reception signal. Alternatively, dummy sub-carriers are reproduced based on the output signal of the decoding process, so that the permutation process is performed using weighted-calculation-completed dummy sub-carrier signals. As described above, it is possible to capture reception signals of desired waves with a reduced influence of interference signals; thus, it is possible to permutate sub-carriers above the interference band within wireless signals received using those values.

In the case of a reception device adopting a soft decision decoder, the hard decision decoder 130 is implemented to perform hard decision on soft decision values, output from a decoder (i.e. the soft decision decoder 120), so as to produce hard decision values, thus implementing repetitive decoding by way of the same permutation process as the hard decision decoder. As the likelihood for sub-carriers above the interference band, it is possible to directly assign a weighted value of the soft decision output. In this case, the dummy transmission process and the dummy modulation process are not needed.

In the repetitive decoding, dummy sub-carriers and dummy retransmission signals, which are used as permutation values in the second decoding process onwards, are subjected to weighting based on weight coefficients.

The dummy sub-carriers and dummy retransmission signals are produced based on the likelihood or decoded values in the preceding decoding process. This makes it possible to adjust reliability between reception signals and permutation signals. Thus, it is possible to improve the reproducibility of signals during permutation and to thereby reduce the influence of interference waves.

Dummy retransmission signals are produced by multiplying dummy transmission signals by transmission path estimate values. In the permutation process, reception signals are mixed with dummy retransmission signals, i.e. reproduction signals, in the interference band.

This makes it possible to perform the permutation process prior to the decoding process; hence, the present invention can be implemented without substantially modifying generally-known configurations of demodulators and decoders. As the mixing process, it is possible to select an arbitrary mixing method from among the maximum ratio mixing method, the common-mode mixing method, and the selective mixing method.

The present invention is not necessarily limited to the foregoing embodiments, which can be modified without departing from essential matters of the present invention. As the coding method in the reception method of the present invention, it is possible to employ any types of coding methods, wherein no special limitations are applied to the number of constituent parts and their connection manners in the reception device. As the forward error correction coding method adapted to desired waves, it is preferable to employ convolutional coding unaccompanied with repetitive decoding, for example, whereas it is possible to adopt a method combining the turbo coding (or decoding) and the repetitive decoding of the present invention.

The interference band detection process of the present invention is equivalent to the process of the interference band detector 15. The weight coefficient generation process of the present invention is equivalent to the process of the weight coefficient generator 25, 21. The weighted calculation process of the present invention is equivalent to the process of the weighted calculation unit 45. The permutation process of the present invention is equivalent to the process of the permutation unit 110, 210 and the mixer 310. The decoding process of the present invention is equivalent to the process of the soft decision decoder 120 and the hard decision decoder 220, 320. The soft decision decoding process of the present invention is equivalent to the process of the soft decision decoder 120. The hard decision decoding process of the present invention is equivalent to the process of the hard decision decoder 220, 320. The dummy modulation process of the present invention is equivalent to the process of the dummy modulation unit 280. The estimation process of the present invention is equivalent to the process of the transmission path estimate unit 370. The transmission path coefficient multiplication process of the present invention is equivalent to the process of the transmission path coefficient multiplier 380.

As described above, according to the foregoing embodiments of the present invention, it is possible to easily improve a reception error correcting ability in comparison with the prior art even when a plurality of convolution signals exists. The process of "interference replica reproduction & subtraction" using replicas of interference waves, which is listed as the prior art, needs a certain number of replica generation circuits and decoding circuits in correspondence with the number of interference waves, wherein it is technologically difficult to detect the number of interference waves. In contrast, the present invention needs to perform the likelihood mask process in conformity with frequency bands having interference waves instead of in conformity with the number of interference waves; hence, the present invention is able to easily cope with the situation involved in a plurality of convolution signals.

INDUSTRIAL APPLICABILITY

The reception device of the present invention can be applied to reception devices employed in wireless communication systems such as wireless LANs.

DESCRIPTION OF REFERENCE NUMERALS

1, 1a, 2 receiver
10 interference band detector
11 CINR estimate unit
20 weight coefficient generator
30 demodulator
40 weighted calculation unit
50 decoder
2a, 2b wireless LAN station
100 reception device
15 interference band detector
25 weight coefficient generator
35 demodulator
45 weighted calculation unit
110 permutation unit
120 soft decision decoder
130 hard decision unit

The invention claimed is:

1. A reception method adapted to a reception device receiving wireless signals in a multicarrier wireless communication system adopting forward error correction codes, which transmits and receives wireless signals constituted of a plurality of sub-carriers, said reception method comprising:
an interference band detection process for selecting sub-carriers causing reception errors from among the plurality of sub-carriers by way of specific sub-carriers;
a weight coefficient generation process for generating weight coefficients, reducing reliability in sub-carriers, not depending on a power ratio (i.e, a D/U ratio) between a desired wave and an interference wave, with respect to the selected specific sub-carriers compared to other sub-carriers;
a demodulation process for demodulating the received wireless signals of sub-carriers;
a weighted calculation process for performing weighted calculation applying the weight coefficients to demodulated values of sub-carriers of wireless signals; and
a decoding process for performing a decoding process for error correction on calculated values of sub-carriers.

2. A reception method adapted to a multicarrier wireless communication system adopting forward error correction codes, which receives and transmits wireless signals constituted of a plurality of sub-carriers, said reception method comprising:

an interference band detection process for detecting a frequency band of a sub-carrier susceptible to an interference wave among the plurality of received sub-carriers by way of an interference band, thus outputting interference band information;

a weight coefficient generation process for generating weight coefficients for reducing reliability in sub-carriers based on the interference band information with respect to the interference band compared to a frequency band of a sub-carrier insusceptible to the interference wave;

a weighted calculation process for performing weighted calculation applying the weight coefficients to demodulated values of the sub-carriers;

a permutation process for permutating a reproduction signal with respect to a reception signal of the interference band within frequency bands attributed to the plurality of sub-carriers; and a decoding process for performing a decoding process for error correction on the sub-carrier of the wireless signal including the permutated frequency band, thus outputting a decoding result and a signal forming the reproduction signal for use in a next stage of the permutation process.

3. A reception method adapted to a reception device receiving wireless signals in a multicarrier wireless communication system adopting forward error correction codes, which transmits and receives wireless signals constituted of a plurality of sub-carriers, said reception method comprising:

an interference band detection process for selecting sub-carriers causing reception errors from among the plurality of sub-carriers by way of specific sub-carriers;

a weight coefficient generation process for generating weight coefficients, reducing reliability in sub-carriers, not depending on a power ratio (i.e, a D/U ratio) between a desired wave and an interference wave, with respect to the selected specific sub-carriers compared to other sub-carriers;

a demodulation process for demodulating the received wireless signals of sub-carriers;

a weighted calculation process for performing weighted calculation applying the weight coefficients to demodulated values of sub-carriers of wireless signals; and a decoding process for performing a decoding process for error correction on calculated values of sub-carriers, wherein the weight coefficient generation process generates a weight coefficient for permutating an average value among candidates of demodulated values with respect to the specific sub-carrier.

4. A reception method adapted to a reception device receiving wireless signals in a multicarrier wireless communication system adopting forward error correction codes, which transmits and receives wireless signals constituted of a plurality of sub-carriers, said reception method comprising:

an interference band detection process for selecting sub-carriers causing reception errors from among the plurality of sub-carriers by way of specific sub-carriers;

a weight coefficient generation process for generating weight coefficients, reducing reliability in sub-carriers, not depending on a power ratio (i.e, a D/U ratio) between a desired wave and an interference wave, with respect to the selected specific sub-carriers compared to other sub-carriers;

a demodulation process for demodulating the received wireless signals of sub-carriers;

a weighted calculation process for performing weighted calculation applying the weight coefficients to demodulated values of sub-carriers of wireless signals; and a decoding process for performing a decoding process for error correction on calculated values of sub-carriers, wherein the interference band detection process detects the specific sub-carrier causing a reception error upon selecting a sub-carrier having a high reception level at a timing precluding a desired wave or based on a measurement result regarding the reception level of the sub-carrier precluding the desired wave.

5. A reception method adapted to a reception device receiving wireless signals in a multicarrier wireless communication system adopting forward error correction codes, which transmits and receives wireless signals constituted of a plurality of sub-carriers, said reception method comprising:

an interference band detection process for selecting sub-carriers causing reception errors from among the plurality of sub-carriers by way of specific sub-carriers;

a weight coefficient generation process for generating weight coefficients, reducing reliability in sub-carriers, not depending on a power ratio (i.e, a D/U ratio) between a desired wave and an interference wave, with respect to the selected specific sub-carriers compared to other sub-carriers;

a demodulation process for demodulating the received wireless signals of sub-carriers;

a weighted calculation process for performing weighted calculation applying the weight coefficients to demodulated values of sub-carriers of wireless signals; and a decoding process for performing a decoding process for error correction on calculated values of sub-carriers, wherein the interference band detection process detects the specific sub-carrier causing a reception error upon selecting a sub-carrier having a high reception level among measured reception levels of wireless signals from a base station different from a base station serving as a communication target of the reception device in frequency bands of sub-carriers attributed to the desired wave serving as a reception target every predetermined period.

6. A reception method adapted to a reception device receiving wireless signals in a multicarrier wireless communication system adopting forward error correction codes, which transmits and receives wireless signals constituted of a plurality of sub-carriers, said reception method comprising:

an interference band detection process for selecting sub-carriers causing reception errors from among the plurality of sub-carriers by way of specific sub-carriers;

a weight coefficient generation process for generating weight coefficients, reducing reliability in sub-carriers, not depending on a power ratio (i.e, a D/U ratio) between a desired wave and an interference wave, with respect to the selected specific sub-carriers compared to other sub-carriers;

a demodulation process for demodulating the received wireless signals of sub-carriers;

a weighted calculation process for performing weighted calculation applying the weight coefficients to demodulated values of sub-carriers of wireless signals; and a decoding process for performing a decoding process for error correction on calculated values of sub-carriers, wherein the interference band detection process calculates a CINR (Carrier to Interference Noise Ratio) value using either a pilot signal of a desired wave or a preamble signal, compares the calculated CINR value with a predetermined value, and selects a sub-carrier whose CINR value is lower than the predetermined value as the specific sub-carrier causing a reception error.

7. A reception method adapted to a multicarrier wireless communication system adopting forward error correction codes, which receives and transmits wireless signals constituted of a plurality of sub-carriers, said reception method comprising:
 an interference band detection process for detecting a frequency band of a sub-carrier susceptible to an interference wave among the plurality of received sub-carriers by way of an interference band, thus outputting interference band information;
 a weight coefficient generation process for generating weight coefficients for reducing reliability in sub-carriers based on the interference band information with respect to the interference band compared to a frequency band of a sub-carrier insusceptible to the interference wave;
 a weighted calculation process for performing weighted calculation applying the weight coefficients to demodulated values of the sub-carriers;
 a permutation process for permutating a reproduction signal with respect to a reception signal of the interference band within frequency bands attributed to the plurality of sub-carriers; and
 a decoding process for performing a decoding process for error correction on the sub-carrier of the wireless signal including the permutated frequency band, thus outputting a decoding result and a signal forming the reproduction signal for use in a next stage of the permutation process,
 wherein the decoding process includes a soft decision decoding process for producing a soft decision decoding result via the decoding process for error correction with respect to the input sub-carrier and a hard decision process for defining a decoding result by way of a decision process based on the soft decision decoding result, and wherein the permutation process replaces the sub-carrier subjected to the weighted calculation based on the reception signal with a sub-carrier based on the soft decision decoding result serving as the reproduction signal.

8. A reception method adapted to a multicarrier wireless communication system adopting forward error correction codes, which receives and transmits wireless signals constituted of a plurality of sub-carriers, said reception method comprising:
 an interference band detection process for detecting a frequency band of a sub-carrier susceptible to an interference wave among the plurality of received sub-carriers by way of an interference band, thus outputting interference band information;
 a weight coefficient generation process for generating weight coefficients for reducing reliability in sub-carriers based on the interference band information with respect to the interference band compared to a frequency band of a sub-carrier insusceptible to the interference wave;
 a weighted calculation process for performing weighted calculation applying the weight coefficients to demodulated values of the sub-carriers;
 a permutation process for permutating a reproduction signal with respect to a reception signal of the interference band within frequency bands attributed to the plurality of sub-carriers; and
 a decoding process for performing a decoding process for error correction on the sub-carrier of the wireless signal including the permutated frequency band, thus outputting a decoding result and a signal forming the reproduction signal for use in a next stage of the permutation process,
 further comprising a dummy modulation process for reproducing a dummy transmission signal based on the signal forming the reception signal output from the decoding process, wherein the permutation process permutates the sub-carrier, which is subjected to the weighted calculation based on the reception signal, on the basis of a dummy sub-carrier serving as the reproduction signal.

9. The reception method according to claim 8, wherein the dummy sub-carrier is weighted based on the weight coefficient.

10. A reception method adapted to a multicarrier wireless communication system adopting forward error correction codes, which receives and transmits wireless signals constituted of a plurality of sub-carriers, said reception method comprising:
 an interference band detection process for detecting a frequency band of a sub-carrier susceptible to an interference wave among the plurality of received sub-carriers by way of an interference band, thus outputting interference band information;
 a weight coefficient generation process for generating weight coefficients for reducing reliability in sub-carriers based on the interference band information with respect to the interference band compared to a frequency band of a sub-carrier insusceptible to the interference wave;
 a weighted calculation process for performing weighted calculation applying the weight coefficients to demodulated values of the sub-carriers;
 a permutation process for permutating a reproduction signal with respect to a reception signal of the interference band within frequency bands attributed to the plurality of sub-carriers; and
 a decoding process for performing a decoding process for error correction on the sub-carrier of the wireless signal including the permutated frequency band, thus outputting a decoding result and a signal forming the reproduction signal for use in a next stage of the permutation process,
 further comprising a dummy transmission process for producing a dummy transmission signal based on the signal forming the reproduction signal output from the decoding process, an estimate process for calculating a transmission path estimate value based on the reception signal, and a transmission path coefficient multiplication process for multiplying the dummy transmission signal by the transmission path estimate value, thereby calculating the dummy retransmission signal, wherein the permutation process permutates the reception signal based on the dummy retransmission signal serving as the reproduction signal.

11. The reception method according to claim 10, wherein the permutation process performs a calculation based on weight coefficients set to the reception signal and the dummy retransmission signal, thus performing a mixing process based on the calculation result.

12. The reception method according to claim 10, wherein the permutation process performs a mixing process according to any one of a maximum ratio mixing method, a common-mode mixing method, and a selective mixing method.

13. A reception device receiving wireless signals in a multicarrier wireless communication system adopting forward error correction codes, which transmits and receives wireless signals constituted of a plurality of sub-carriers, said reception device comprising:
- a demodulator for demodulating received wireless signals of sub-carriers;
- an interference band detector for selecting sub-carriers causing reception errors from among the plurality of sub-carriers by way of specific sub-carriers;
- a weight coefficient generator for generating weight coefficients, reducing reliability in sub-carriers, not depending on a power ratio (i.e, a D/U ratio) between a desired wave and an interference wave, with respect to the selected specific sub-carriers compared to other sub-carriers;
- a weighted calculation unit for performing weighted calculation applying the weight coefficients to demodulated values of sub-carriers of wireless signals demodulated by the demodulator; and
- a decoder for performing a decoding process for error correction on values calculated by the weighted calculation unit in connection with sub-carriers.

14. A reception device adapted to a multicarrier wireless communication system adopting forward error correction codes, which receives and transmits wireless signals constituted of a plurality of sub-carriers, said reception device comprising:
- an interference band detector for detecting a frequency band of a sub-carrier susceptible to an interference wave among the plurality of received sub-carriers by way of an interference band, thus outputting interference band information;
- a weight coefficient generator for generating weight coefficients for reducing reliability in sub-carriers based on the interference band information with respect to the interference band compared to a frequency band of a sub-carrier insusceptible to the interference wave;
- a weighted calculation unit for performing weighted calculation applying the weight coefficients to demodulated values of the sub-carriers;
- a permutation unit for permutating a reproduction signal with respect to a reception signal of the interference band within frequency bands attributed to the plurality of sub-carriers; and
- a decoder for performing a forward error correction coding process on the sub-carrier of the wireless signal including the permutated frequency band, thus outputting a decoding result and a signal forming the reproduction signal for use in the permutation unit.

15. The reception device according to claim 14, wherein the decoder includes a soft decision decoding unit for producing a soft decision decoding result via the decoding process for error correction with respect to the input sub-carrier and a hard decision unit for defining a decoding result by way of a decision process based on the soft decision decoding result, and wherein the permutation unit replaces the sub-carrier subjected to the weighted calculation based on the reception signal with a sub-carrier based on the soft decision decoding result serving as the reproduction signal.

16. The reception device according to claim 14, further comprising a dummy modulation unit for reproducing a dummy transmission signal based on the signal forming the reception signal output from the decoder, wherein the permutation unit permutates the sub-carrier, which is subjected to the weighted calculation based on the reception signal, on the basis of a dummy sub-carrier serving as the reproduction signal.

17. The reception device according to claim 16, wherein the dummy sub-carrier is weighted based on the weight coefficient.

18. The reception device according to claim 14, further comprising a dummy transmission unit for producing a dummy transmission signal based on the signal forming the reproduction signal output from the decoder, an estimate unit for calculating a transmission path estimate value based on the reception signal, and a transmission path coefficient multiplication unit for multiplying the dummy transmission signal by the transmission path estimate value, thereby calculating the dummy retransmission signal, wherein the permutation unit permutates the reception signal based on the dummy retransmission signal serving as the reproduction signal.

19. The reception device according to claim 18, wherein the permutation unit performs a calculation based on weight coefficients set to the reception signal and the dummy retransmission signal, thus performing a mixing process based on the calculation result.

20. The reception device according to claim 18, wherein the permutation unit performs a mixing process according to any one of a maximum ratio mixing method, a common-mode mixing method, and a selective mixing method.

21. A reception device receiving wireless signals in a multicarrier wireless communication system adopting forward error correction codes, which transmits and receives wireless signals constituted of a plurality of sub-carriers, said reception device comprising:
- a demodulator for demodulating received wireless signals of sub-carriers;
- an interference band detector for selecting sub-carriers causing reception errors from among the plurality of sub-carriers by way of specific sub-carriers;
- a weight coefficient generator for generating weight coefficients, reducing reliability in sub-carriers, not depending on a power ratio (i.e, a D/U ratio) between a desired wave and an interference wave, with respect to the selected specific sub-carriers compared to other sub-carriers;
- a weighted calculation unit for performing weighted calculation applying the weight coefficients to demodulated values of sub-carriers of wireless signals demodulated by the demodulator; and
- a decoder for performing a decoding process for error correction on values calculated by the weighted calculation unit in connection with sub-carriers,
- wherein the weight coefficient generator generates a weight coefficient for permutating an average value among candidates of demodulated values with respect to the specific sub-carrier.

22. A reception device receiving wireless signals in a multicarrier wireless communication system adopting forward error correction codes, which transmits and receives wireless signals constituted of a plurality of sub-carriers, said reception device comprising:
- a demodulator for demodulating received wireless signals of sub-carriers;
- an interference band detector for selecting sub-carriers causing reception errors from among the plurality of sub-carriers by way of specific sub-carriers;
- a weight coefficient generator for generating weight coefficients, reducing reliability in sub-carriers, not depending on a power ratio (i.e, a D/U ratio) between a desired wave and an interference wave, with respect to the selected specific sub-carriers compared to other sub-carriers;

a weighted calculation unit for performing weighted calculation applying the weight coefficients to demodulated values of sub-carriers of wireless signals demodulated by the demodulator; and a decoder for performing a decoding process for error correction on values calculated by the weighted calculation unit in connection with sub-carriers, wherein the interference band detector detects the specific sub-carrier causing a reception error upon selecting a sub-carrier having a high reception level at a timing precluding a desired wave or based on a measurement result regarding the reception level of the sub-carrier precluding the desired wave.

23. A reception device receiving wireless signals in a multicarrier wireless communication system adopting forward error correction codes, which transmits and receives wireless signals constituted of a plurality of sub-carriers, said reception device comprising:

a demodulator for demodulating received wireless signals of sub-carriers;

an interference band detector for selecting sub-carriers causing reception errors from among the plurality of sub-carriers by way of specific sub-carriers;

a weight coefficient generator for generating weight coefficients, reducing reliability in sub-carriers, not depending on a power ratio (i.e, a D/U ratio) between a desired wave and an interference wave, with respect to the selected specific sub-carriers compared to other sub-carriers;

a weighted calculation unit for performing weighted calculation applying the weight coefficients to demodulated values of sub-carriers of wireless signals demodulated by the demodulator; and a decoder for performing a decoding process for error correction on values calculated by the weighted calculation unit in connection with sub-carriers, wherein the interference band detector detects the specific sub-carrier causing a reception error upon selecting a sub-carrier having a high reception level among measured reception levels of wireless signals from a base station different from a base station serving as a communication target of the reception device in frequency bands of sub-carriers attributed to the desired wave serving as a reception target every predetermined period.

24. A reception device receiving wireless signals in a multicarrier wireless communication system adopting forward error correction codes, which transmits and receives wireless signals constituted of a plurality of sub-carriers, said reception device comprising:

a demodulator for demodulating received wireless signals of sub-carriers;

an interference band detector for selecting sub-carriers causing reception errors from among the plurality of sub-carriers by way of specific sub-carriers;

a weight coefficient generator for generating weight coefficients, reducing reliability in sub-carriers, not depending on a power ratio (i.e, a D/U ratio) between a desired wave and an interference wave, with respect to the selected specific sub-carriers compared to other sub-carriers;

a weighted calculation unit for performing weighted calculation applying the weight coefficients to demodulated values of sub-carriers of wireless signals demodulated by the demodulator; and a decoder for performing a decoding process for error correction on values calculated by the weighted calculation unit in connection with sub-carriers, wherein the interference band detector calculates a CINR (Carrier to Interference Noise Ratio) value using either a pilot signal of a desired wave or a preamble signal, compares the calculated CINR value with a predetermined value, and selects a sub-carrier whose CINR value is lower than the predetermined value as the specific sub-carrier causing a reception error.

* * * * *